(12) United States Patent
Fuglevand et al.

(10) Patent No.: US 11,427,351 B2
(45) Date of Patent: Aug. 30, 2022

(54) CARRIER AND OPERATIONAL FRAME SYSTEM AND METHODS OF ASSEMBLING A STRUCTURE

(71) Applicant: The Boeing Company, Chicago, IL (US)

(72) Inventors: Lane W. Fuglevand, Everett, WA (US); Brian M. Capobianco, Seattle, WA (US); Joseph M. Gholami, Seattle, WA (US); Kory K. Dehart, Everett, WA (US); James F. Hammond, St. Louis, MO (US); Aaron A. Denning, Mount Vernon, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 16/706,574

(22) Filed: Dec. 6, 2019

(65) Prior Publication Data

US 2021/0171219 A1 Jun. 10, 2021

(51) Int. Cl.
*B64F 5/10* (2017.01)
*B64C 1/06* (2006.01)
*B64C 1/12* (2006.01)

(52) U.S. Cl.
CPC ............... *B64F 5/10* (2017.01); *B64C 1/068* (2013.01); *B64C 1/12* (2013.01)

(58) Field of Classification Search
CPC .............. B64F 5/10; B64C 1/068; B64C 1/12
See application file for complete search history.

(56) References Cited

U.S. PATENT DOCUMENTS

| 2,374,894 | A | 5/1945 | Pioch et al. |
| 5,297,760 | A | 3/1994 | Hart-Smith |
| 10,160,531 | B2 | 12/2018 | Payne |
| 2014/0077434 | A1 | 3/2014 | Chang et al. |
| 2014/0077471 | A1 | 3/2014 | Chang et al. |
| 2014/0331473 | A1 | 11/2014 | Smith et al. |

FOREIGN PATENT DOCUMENTS

| DE | 712525 C | 10/1941 |
| DE | 102012015666 A1 | 2/2014 |
| EP | 2965836 A1 | 1/2016 |
| EP | 3293105 A1 | 3/2018 |
| EP | 3395692 A1 | 10/2018 |
| FR | 2788743 A1 | 7/2000 |
| JP | H0885497 A | 9/1994 |

OTHER PUBLICATIONS

Extended European Search Report dated May 4, 2021, regarding EP Application No. 20208052.9; 11 pages.

*Primary Examiner* — Timothy D Collins
*Assistant Examiner* — Eric Acosta
(74) *Attorney, Agent, or Firm* — Yee & Associates, P.C.

(57) ABSTRACT

A carrier and operational frame system and methods of assembling a structure are presented. The carrier and operational frame system comprises a plurality of panel carriers, each panel carrier comprising a frame configured to act as a strongback to a panel and indexing features configured to interface with at least one other panel carrier of the plurality of panel carriers.

26 Claims, 16 Drawing Sheets

CARRIER AND OPERATIONAL FRAME SYSTEM AND METHODS OF ASSEMBLING A STRUCTURE

BACKGROUND INFORMATION

1. Field

The present disclosure relates generally to assembling large structures, and more specifically to reducing costs and time for assembling and performing manufacturing operations on large structures.

2. Background

In some methods of forming aircraft, separate fuselage panels are assembled to form a fuselage. During formation of the fuselage, manufacturing operations are performed on the fuselage panels.

To assemble the fuselage, the fuselage panels are received, removed from any backing materials, and attached to a number of assembly tools. Each fuselage panel is indexed to the number of assembly tools or each other.

The assembly and manufacturing processes take a substantial amount of time and resources. The assembly tooling can utilize a large amount of valuable manufacturing floor volume.

Therefore, it would be desirable to have a method and apparatus that takes into account at least some of the issues discussed above, as well as other possible issues.

SUMMARY

An embodiment of the present disclosure provides a method of assembling a structure.

Transportation assemblies comprising a plurality of panel carriers are received, each holding a panel of a plurality of panels. The plurality of panel carriers is connected to form an operational platform around the plurality of panels. At least one manufacturing operation is performed on at least one panel of the plurality of panels through the operational platform.

Another embodiment of the present disclosure provides a method of assembling a structure. A panel is attached to a panel carrier having a frame and indexing features. The panel carrier holding the panel is connected to a second panel carrier holding a second panel to form a carrier and operational frame system around a plurality of panels comprising the panel and the second panel carrier. At least one manufacturing operation is performed on the panel through an operational platform of the panel carrier.

Yet another embodiment of the present disclosure provides a carrier and operational frame system. The carrier and operational frame system comprises a plurality of panel carriers, each panel carrier comprising a frame configured to act as a strongback to a panel and indexing features configured to interface with at least one other panel carrier of the plurality of panel carriers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that conventionally fuselage panels are shipped in a cage or container-like structure. The illustrative examples recognize and take into account that after shipping, the fuselage panels are then transferred into a number of transportation and assembly tools. The illustrative examples recognize and take into account that in some conventional processes the fuselage panels encounter three separate sets of tools: shipping (transporting), staging, and build tooling. The illustrative examples recognize and take into account that each tooling transfer adds manufacturing time to the fuselage.

The illustrative examples recognize and take into account that one conventional way to assemble a fuselage is to arrange decking all the way around at different elevations. Surrounding the fuselage with decking provides access for operators or assemblers such as robots to perform manufacturing operations but limits what build operations can fit in those areas.

The illustrative examples recognize and take into account that assembling decking around the fuselage takes up valuable factory floor space. The illustrative examples recognize and take into account that assembling decking around the fuselage is undesirably inflexible for changes to the build plan or product.

The illustrative examples recognize and take into account that another way to perform operations on the fuselage assembly is to have mobile access stands. The mobile access stands allow the parts and equipment to come and go but entails the fuselage structure being assembled to a point where the fuselage can support itself.

The illustrative examples recognize and take into account that reducing manufacturing time reduces costs and can increase production capacity. The illustrative examples recognize and take into account that by reducing the quantity of tooling transfers, the manufacturing time for a fuselage can be reduced. The illustrative examples recognize and take into account that utilizing one set of tooling for multiple functions can reduce the manufacturing time for a fuselage. The illustrative examples recognize and take into account that manufacturing floor space is valuable and reducing the footprint of assembly tooling would be desirable.

Figure 1:
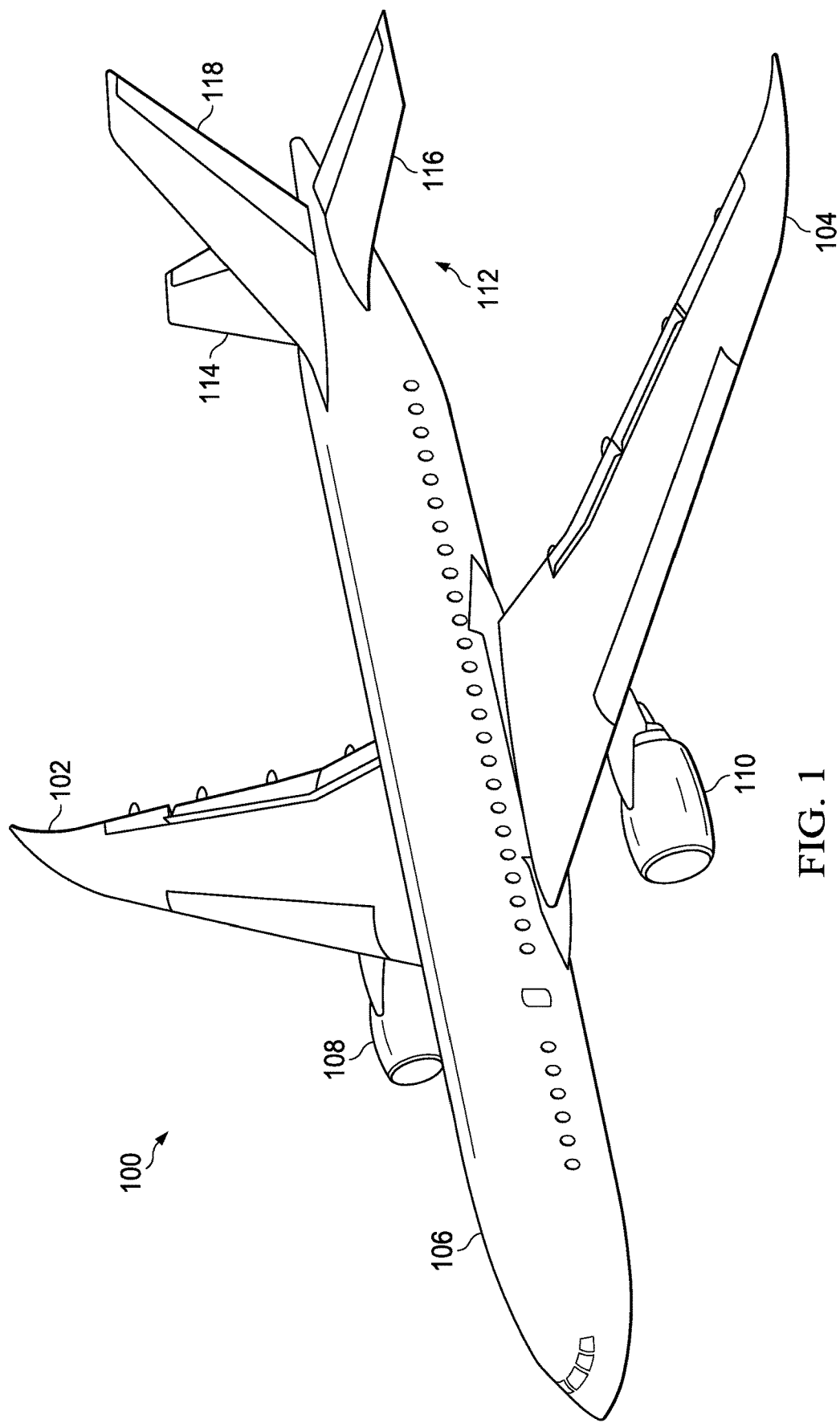
FIG. 1 is an illustration of an aircraft in which an illustrative embodiment may be implemented.

Turning now to FIG. 1, an illustration of an aircraft is depicted in which an illustrative embodiment may be implemented. Aircraft 100 is an example of an aircraft which can be formed using carrier and operational frame system 1300 of FIG. 13. Aircraft 100 is an example of an aircraft which can be formed using carrier and operational frame system 200 of FIG. 2.

In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Figure 2:
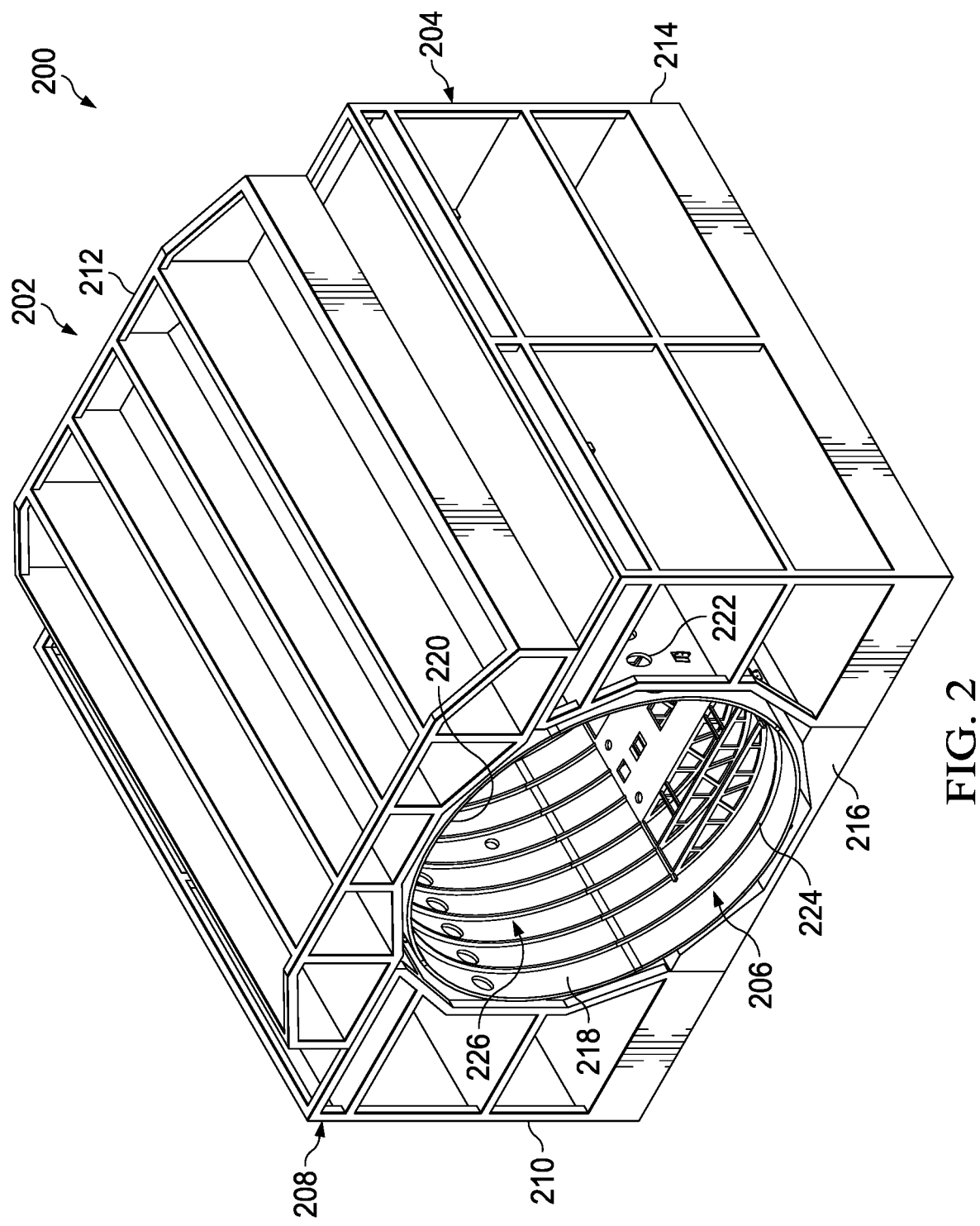
FIG. 2 is an illustration of a perspective view of a carrier and operational frame system surrounding a plurality of panels in accordance with an illustrative embodiment.

Turning now to FIG. 2, an illustration of a perspective view of a carrier and operational frame system surrounding a plurality of panels is depicted in accordance with an illustrative embodiment. Carrier and operational frame system 200 is a physical implementation of carrier and operational frame system 1300 of FIG. 13. Carrier and operational frame system 200 can be used to form a portion of aircraft 100 of FIG. 1. Plurality of panels 206 can be joined together to form a portion of body 106 of aircraft 100.

Carrier and operational frame system 200 comprises plurality of panel carriers 202. Each panel carrier of plurality of panel carriers 202 comprises a frame configured to act as a strongback to a panel and indexing features configured to interface with at least one other panel carrier of plurality of panel carriers 202.

As depicted, plurality of panel carriers 202 is joined together to form operational platform 204 around plurality of panels 206. Operational platform 204 acts as a jig for plurality of panels 206. Operational platform 204 acting as a jig holds plurality of panels 206 and provides locations for tools to work on plurality of panels 206. Plurality of panel carriers 202 joined together forms strongback 208 for the plurality of panels 206.

Each panel of plurality of panels 206 is indexed and attached to a respective panel carrier of plurality of panel carriers 202. Indexing each of plurality of panels 206 to a respective panel carrier of plurality of panel carriers 202 allows for each of plurality of panels 206 to be indexed once. Indexing each of plurality of panels 206 to a respective panel carrier of plurality of panel carriers 202 allows for alignment of plurality of panel carriers 202 relative to each other to also align plurality of panels 206 relative to each other.

By indexing a panel to a respective panel carrier with a desirable threshold, the panel carrier acts to align plurality of panels 206 on a macro level. Each panel carrier of plurality of panel carriers 202 also has panel manipulative arms to align plurality of panels 206 to a desired tolerance on a micro level prior to joining plurality of panels 206 together. Indexing each panel to a respective panel carrier eliminates indexing the panels directly to each other on the macro level.

In carrier and operational frame system 200, at least one panel carrier comprises a number of operational locations configured to receive a respective operational assembly. As depicted, carrier and operational frame system 200 comprises side panel carrier 210, crown panel carrier 212, side panel carrier 214, and keel panel carrier 216. In this illustrative example, side panel carrier 210 and side panel carrier 214 each have a number of operational locations configured to receive a respective operational assembly. As depicted, crown panel carrier 212 and keel panel carrier 216 are depicted without operational locations configured to receive a respective operational assembly. In some non-depicted examples, at least one of crown panel carrier 212 or keel panel carrier 216 has a number of operational locations configured to receive a respective operational assembly.

In some illustrative examples, each operational assembly (not depicted) is an exchangeable module configured to connect to an operational location. Each operational assembly (not depicted) includes at least one of an automated tool or positions for operators to perform manual operations. In some illustrative examples, at least one operational assembly (not depicted) comprises a robotic arm for performing manufacturing operations from a respective operational location.

Each panel carrier of carrier and operational frame system 200 is configured to support a respective panel during transporting, staging, and manufacturing operations. In some illustrative examples, fabrication steps of a panel can also occur on a respective panel carrier. In some illustrative examples, at least one of drilling, joining, or other fabrication steps can be performed while a panel is on a respective panel carrier.

Side panel carrier 210 is configured to support side panel 218 during transporting, staging, and manufacturing operations. Crown panel carrier 212 is configured to support crown panel 220 during transporting, staging, and manufacturing operations. Side panel carrier 214 is configured to support side panel 222 during transportation, staging, and manufacturing operations including assembly to other skin panels. Keel panel carrier 216 is configured to support keel panel 224 during transporting, staging, and manufacturing operations.

Each panel carrier of plurality of panel carriers 202 comprises a frame and indexing features. At least one panel carrier of plurality of panel carriers 202 has a number of operational locations.

In some illustrative examples, each panel carrier of plurality of panel carriers 202 is designed to minimize obstructions to performing operations on plurality of panels 206. In one example, the frame of each panel carrier of plurality of panel carriers 202 is designed to minimize obstructions to performing operations on plurality of panels 206. In some illustrative examples, each panel carrier is designed with operational locations configured to maximize access to plurality of panels 206. In some illustrative examples, the operational locations are designed to accommodate specific operations such as joining plurality of panels 206.

The illustration of carrier and operational frame system 200 and plurality of panels 206 in FIG. 2 is not meant to imply physical or architectural limitations to the manner in which an illustrative embodiment may be implemented. Other components in addition to or in place of the ones illustrated may be used. Some components may be unnecessary. For example, in FIG. 2, each of the longitudinal joints for plurality of panels 206 can be accessed through side panel carrier 210 and side panel carrier 214. In other illustrative examples, at least one panel carrier of plurality of panel carriers 202 can be designed to change access to plurality of panels 206. For example, crown panel carrier 212 can be redesigned to surround less of the circumference of crown panel 220.

As another example, plurality of panel carriers 202 comprises any desirable quantity of panel carriers. In some illustrative examples, plurality of panel carriers 202 has greater than four panel carriers. In other illustrative examples, plurality of panel carriers 202 has fewer than four panel carriers.

In some non-depicted examples, plurality of panels 206 extend past plurality of panel carriers 202 to join plurality of panels 206 to a second plurality of panels. In one illustrative example, a circumferential joint is formed between plurality of panels 206 and a second plurality of panels between plurality of panel carriers 202 and a second plurality of panel carriers supporting the second plurality of panels. In this illustrative example, joining plurality of panels 206 and a second plurality of panels forms a body of an aircraft.

Plurality of panels 206 are joined together using longitudinal splicing while plurality of panel carriers 202 is joined together to form carrier and operational frame system 200. Longitudinal joints between plurality of panels 206 can be formed by accessing plurality of panels 206 through any desirable panel carrier of plurality of panel carriers 202.

As another example, a portion of a cargo floor is shown. In some other non-depicted examples, a passenger compartment floor can also be present. In other illustrative examples, a passenger compartment floor can be added after joining together plurality of panels 206.

As depicted, fuselage frames 226 are present on each of plurality of panels 206. Frames 226 may also be referred to as stiffeners. When fuselage frames 226 are present on plurality of panels 206 prior to joining together plurality of panel carriers 202 to form carrier and operational frame system 200, fuselage frames 226 will be spliced together. In these illustrative examples, fuselage frames 226 are spliced together while creating longitudinal joints for plurality of panels 206.

In some illustrative examples, performing at least one manufacturing operation on at least one panel through the operational platform 204 of the panel carrier comprises attaching a number of frames to the panel. The frames may also be referred to as stiffeners, airframe, stringers, supports, or beams. In one illustrative example, FIG. 2 is a view of carrier and operational frame system 200 and plurality of panels 206 after joining plurality of panel carriers 202 to form carrier and operational frame system 200 and subsequently attaching frames 226 to plurality of panels 206.

FIGS. 3-10 depict components of carrier and operational frame system 200 prior to joining of plurality of panel carriers 202. Although not depicted in FIGS. 3-10, each of plurality panel carriers 202 can have a number of panel manipulative arms to move a panel relative to a respective panel carrier of plurality of panel carriers 202. Adjustments to the position of a panel relative to a respective panel carrier can be made prior to or after joining the panel carrier to adjacent panel carriers.

The panel manipulative arms can move a panel relative to a respective panel carrier of carrier and operational frame system 200. Movement of a panel may include at least one of movement towards or away from the respective panel carrier, up or down relative to the respective panel carrier, left or right relative to the respective panel carrier, or any desirable combination. Movement of a panel in the fore/aft (longitudinal) direction of a fuselage aligns the panel relative to adjacent panels to form a longitudinal splice. Movement of a panel can adjust the loft of the panel. Movement of a panel towards or away from adjacent panels positions the panel within a tolerance for joining to adjacent panels.

In some illustrative examples, cocking or twisting of one panel relative to the other panels can be addressed by a combination of movements of the panel. In some illustrative examples, the front portion of the longitudinal splice appears too tight and the aft end too wide. A combination of movements of the panel helps align the panels for a more parallel alignment situation conducive to longitudinal splicing.

Figure 3:
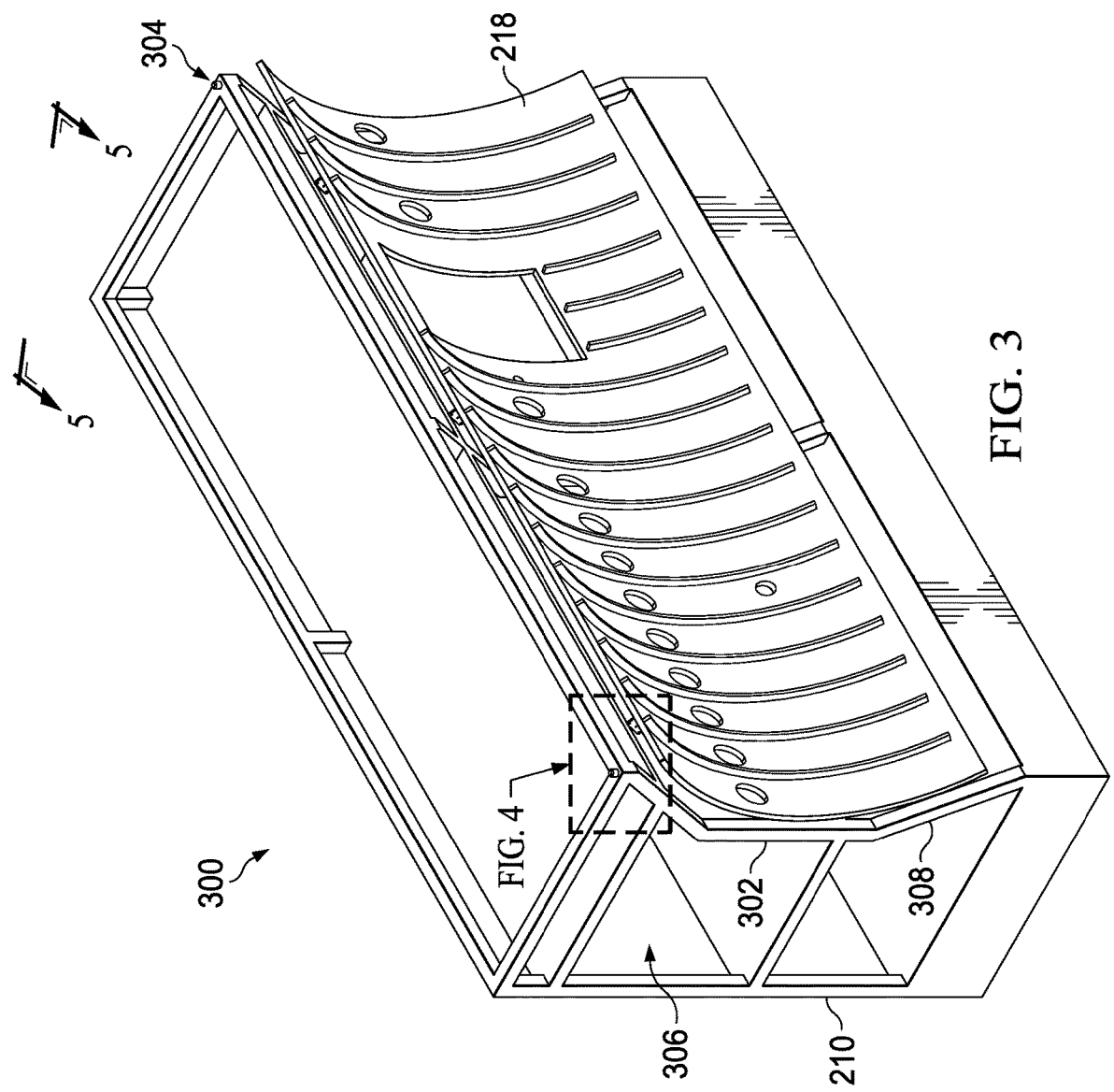
FIG. 3 is an illustration of an interior perspective view of a transportation assembly in accordance with an illustrative embodiment.

Turning now to FIG. 3, an illustration of an interior perspective view of a transportation assembly is depicted in accordance with an illustrative embodiment. Transportation assembly 300 is a physical implementation of side assembly 1332 of FIG. 13. Transportation assembly 300 comprises side panel carrier 210 of FIG. 2 and side panel 218. FIG. 3 is a view of side panel carrier 210 of FIG. 2 and side panel 218 in the same orientation as in FIG. 2. FIG. 3 may be referred to as an interior view as a portion of the interior of carrier and operational frame system 200 is visible. Transportation assembly 300 is configured to support side panel 218 during transportation. Following transportation, transportation assembly 300 is used to index side panel 218 relative to other panels of a plurality of panels, such as plurality of panels 206 of FIG. 2. After joining side panel carrier 210 to other panel carriers to form a carrier and operational frame system, such as carrier and operational frame system 200, side panel carrier 210 supports side panel 218 as manufacturing operations are performed through the carrier and operational frame system.

Side panel carrier 210 comprises frame 302, indexing features 304, and number of operational locations 306. Frame 302 is configured to act as strongback 308 to side panel 218. Indexing features 304 are configured to index side panel carrier 210 to other panel carriers prior to connecting side panel carrier 210 to the other panel carriers to form a carrier and operational frame system, such as carrier and operational frame system 200 of FIG. 2. By indexing side panel carrier 210 to other panel carriers, side panel 218 is indexed relative to other panels of a plurality of panels.

Number of operational locations 306 are open to allow for manufacturing operations to be performed on side panel 218. Number of operational locations 306 of side panel carrier 210 are configured to support operational assemblies to perform operations on side panel 218. For example, number of operational locations 306 permit a technician or a robot access to side panel 218 during assembly to other panels. As another example, number of operational locations 306 permit a technician or a robot access to side panel 218 during other manufacturing operations such as drilling, fastening, surface treatments, or other manufacturing operations. Each operational assembly is a module configured to be located within one of number of operational locations 306. In some illustrative examples, each operational assembly is one of a number of operational assemblies that are exchangeable.

Figure 4:
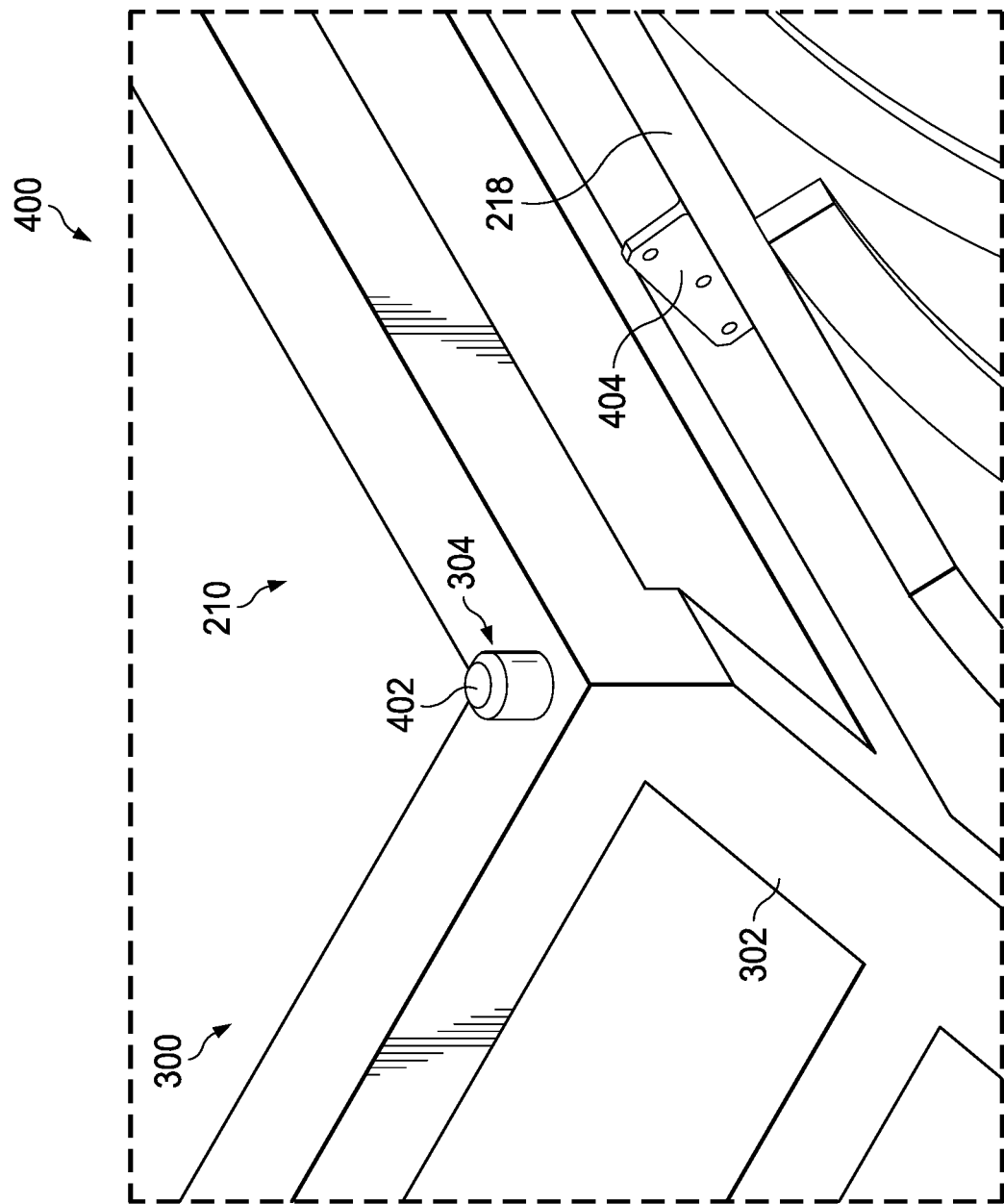
FIG. 4 is an illustration of an interior perspective view of an indexing feature of a transportation assembly in accordance with an illustrative embodiment.

Turning now to FIG. 4, an illustration of an interior perspective view of an indexing feature of a transportation assembly is depicted in accordance with an illustrative embodiment. View 400 is a view within the box labeled FIG. 4 within FIG. 3.

View 400 is a front perspective view of indexing feature 402. Indexing feature 402 is one of indexing features 304 of side panel carrier 210. Indexing feature 402 is configured to index side panel carrier 210 relative to crown panel carrier 212 of FIG. 2.

As depicted, indexing feature 402 is a male feature, but indexing feature 402 can take any desirable form. In some illustrative examples, indexing feature 402 can take the form of a female feature. In some illustrative examples indexing feature 402 is used to initially align side panel carrier 210 prior to performing more controlled adjustments in position.

In this illustrative example, indexing feature 402 takes the form of a "cone". A "cup" of another panel carrier, such as crown panel carrier 212 of FIG. 2, is mated with the cone, indexing feature 402. When indexing feature 402 mates with a cup, alignment between the two panel carriers is within tolerance.

Temporary fitting 404 is visible in view 400. Temporary fitting 404 is a physical implementation of temporary fitting 1340 of FIG. 13. Temporary fitting 404 secures side panel 218 to side panel carrier 210. Any desirable quantity of temporary fittings, including temporary fitting 404 can secure side panel 218 to side panel carrier 210. Temporary fitting 404 takes any desirable form. In some illustrative examples, temporary fitting 404 is connected to side panel 218 by temporary fasteners extending through side panel 218. In some illustrative examples, temporary fitting 404 is secured to side panel 218 by a clamping force.

In some illustrative examples, indexing features 304, including indexing feature 402, have at least one a different location, a different size, or a different type of indexing feature. For example, at least one indexing feature of indexing features 304 can be mounted as a cantilevered structure. In one example, at least one of a location, a size, or a type of indexing feature is selected to accommodate manufacturing operations to be performed on the plurality of panels. In one example, at least one of a location, a size, or a type of indexing feature is selected to accommodate forming longitudinal joints between the plurality of panels.

Figure 5:
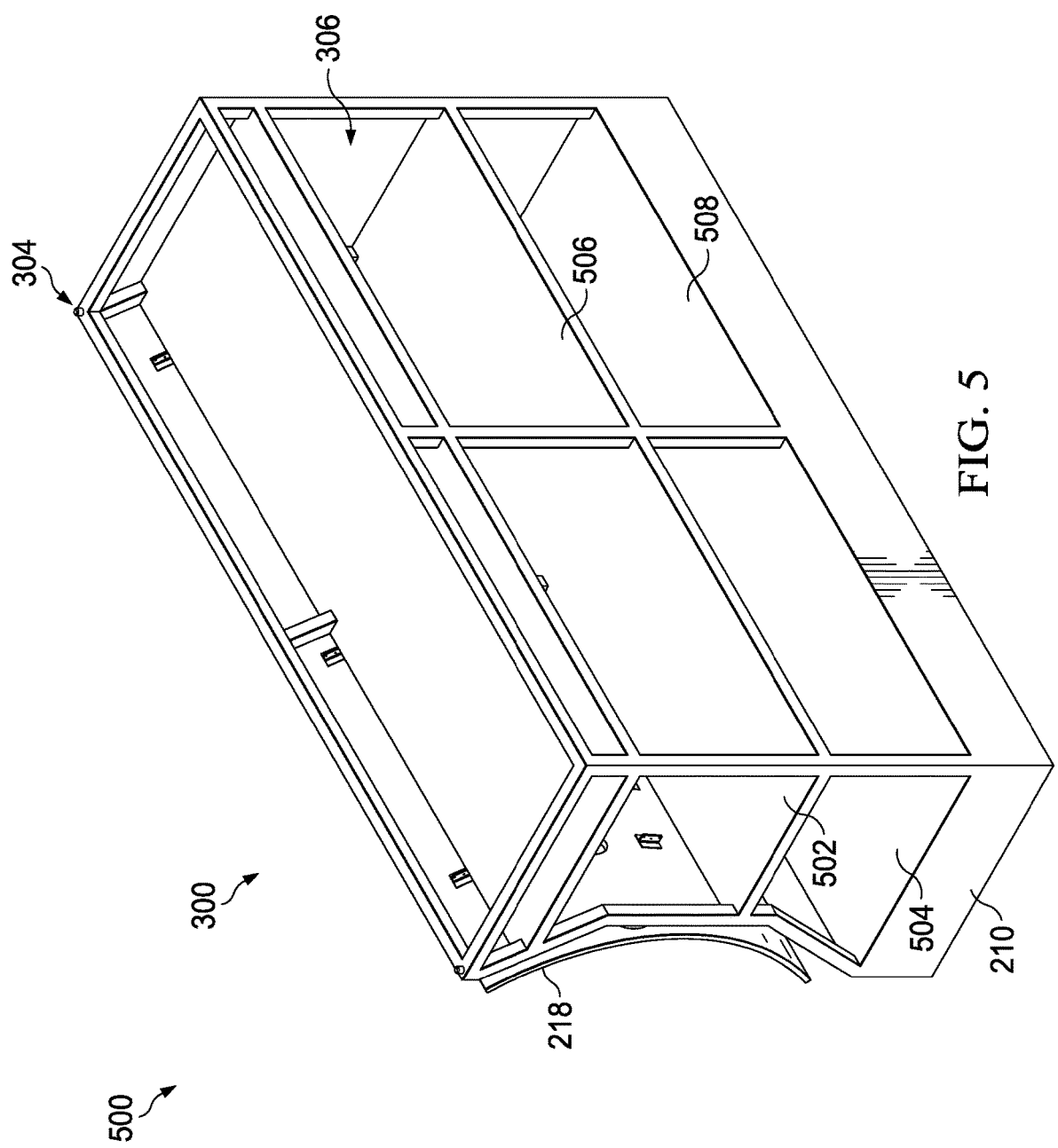
FIG. 5 is an illustration of an exterior perspective view of a transportation assembly in accordance with an illustrative embodiment.

Turning now to FIG. 5, an illustration of an exterior perspective view of a transportation assembly is depicted in accordance with an illustrative embodiment. View 500 is a back view of transportation assembly 300. Number of operational locations 306 is visible in view 500. Number of operational locations 306 includes operational location 502, operational location 504, operational location 506, and operational location 508. Each of operational locations 306 is configured to allow access to side panel 218 to perform manufacturing operations on side panel 218. At least one of operational locations 306 is configured to receive an operational assembly to perform an automated manufacturing operation or allow access for an operator to perform a manufacturing operation on side panel 218.

In some illustrative examples, operations are performed by automated or semi-automated tooling in at least one of operational locations 306. In some illustrative examples, operations are performed by human operators in at least one of operational locations 306. Some portions of side panel 218 obstructed by frame 302 may be accessed manually. In some illustrative examples, frame 302 is designed to accommodate operations to be performed on side panel 218 without obstructing access to portions of side panel 218 to receive the manufacturing operations.

Figure 6:
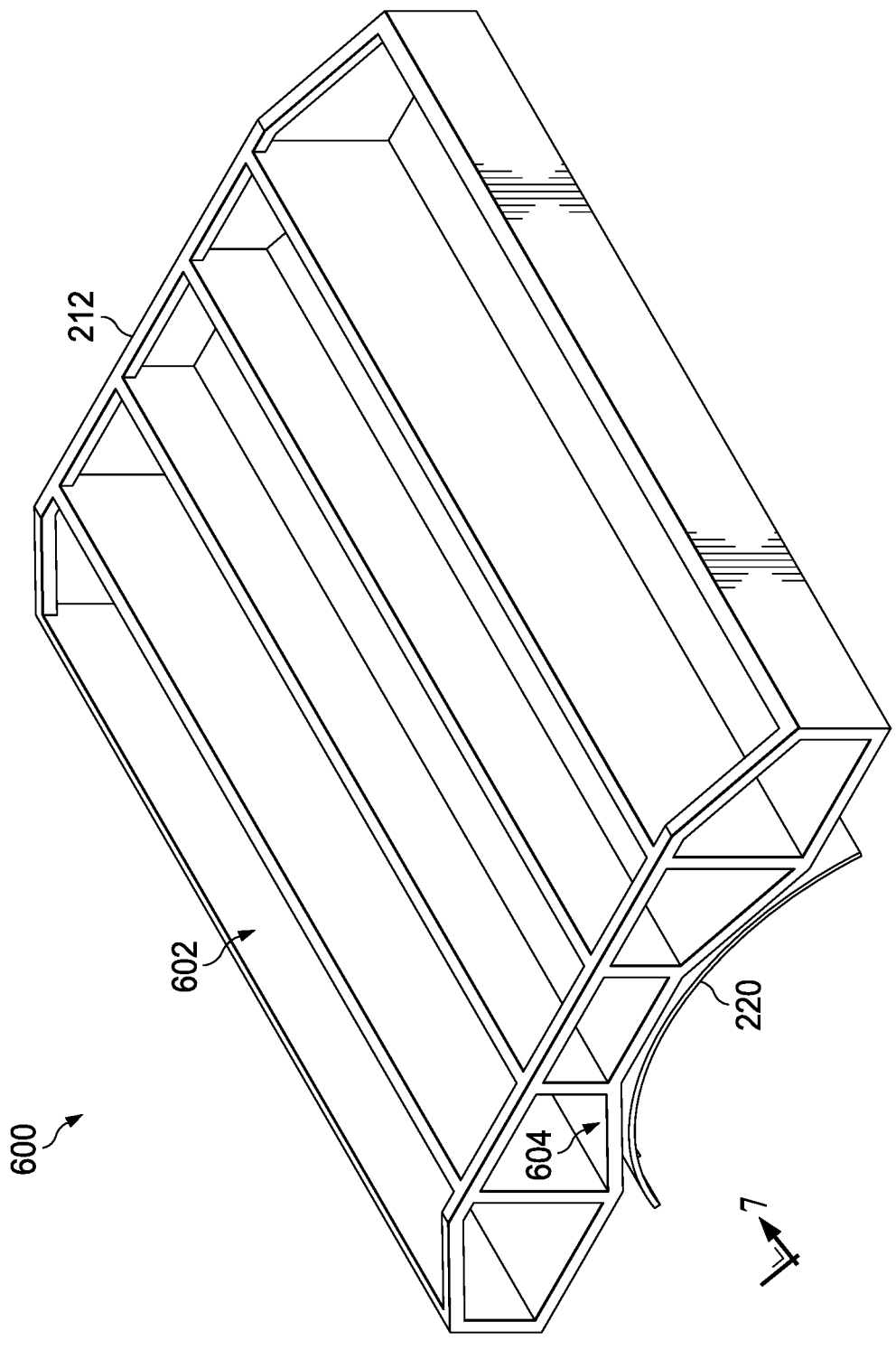
FIG. 6 is an illustration of an exterior perspective view of a transportation assembly in accordance with an illustrative embodiment.

Turning now to FIG. 6, an illustration of a top perspective view of a transportation assembly is depicted in accordance with an illustrative embodiment. Transportation assembly 600 is a physical implementation of crown assembly 1338 of FIG. 13. Transportation assembly 600 comprises crown panel carrier 212 of FIG. 2 and crown panel 220. Transportation assembly 600 is configured to support crown panel 220 during transportation. Following transportation, transportation assembly 600 is used to index crown panel 220 relative to other panels of a plurality of panels, such as plurality of panels 206 of FIG. 2. After joining crown panel carrier 212 to other panel carriers to form a carrier and operational frame system, such as carrier and operational frame system 200, crown panel carrier 212 supports crown panel 220 as manufacturing operations are performed through the carrier and operational frame system.

Crown panel carrier 212 comprises frame 602. Frame 602 is configured to act as strongback 604 to crown panel 220.

The illustration of crown panel carrier 212 of plurality of panel carriers 202 is not meant to imply physical or architectural limitations to the manner in which an illustrative embodiment may be implemented. Other components in addition to or in place of the ones illustrated may be used. Some components may be unnecessary. For example, although operational locations are not provided in crown panel carrier 212, crown panel carrier 212 can include any desirable number of operational locations to access plurality of panels 206. Further, in some illustrative examples, frame 602 of crown panel carrier 212 has a different shape to better access crown panel 220 through one of crown panel carrier 212 or side panel carrier 214.

Figure 7:
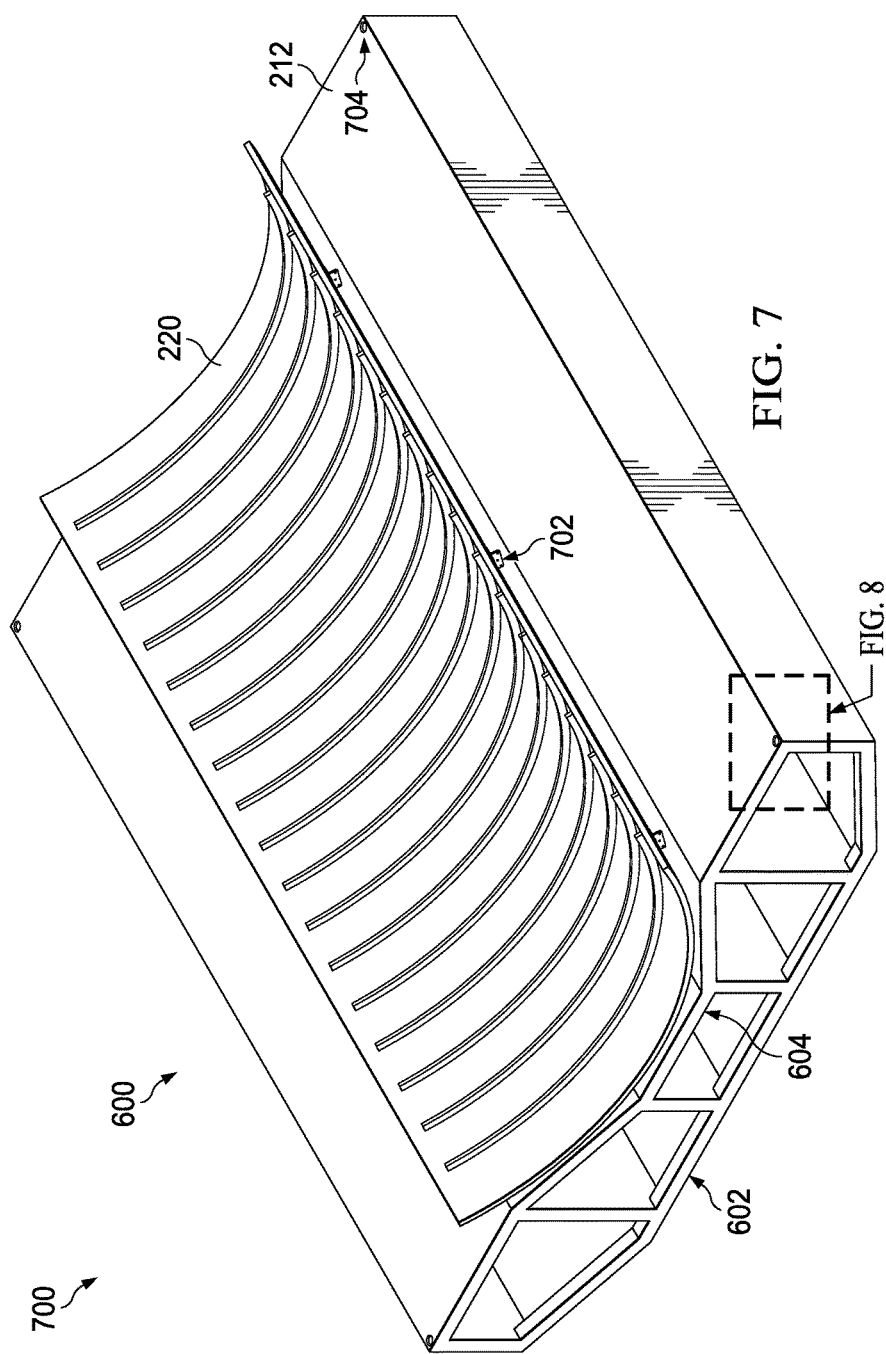
FIG. 7 is an illustration of an interior perspective view of a transportation assembly in accordance with an illustrative embodiment.

Turning now to FIG. 7, an illustration of a bottom perspective view of a transportation assembly is depicted in accordance with an illustrative embodiment. FIG. 7 is an interior out perspective view of crown panel carrier 212 of FIG. 6. View 700 is a bottom view of crown panel carrier 212 and crown panel 220. Temporary fittings 702 are visible in view 700. Temporary fittings 702 secure crown panel 220 to crown panel carrier 212.

Crown panel carrier 212 comprises indexing features 704. Indexing features 704 are configured to index crown panel carrier 212 to other panel carriers prior to connecting crown panel carrier 212 to the other panel carriers to form a carrier and operational frame system, such as carrier and operational frame system 200 of FIG. 2. By indexing crown panel carrier 212 to other panel carriers, crown panel 220 is indexed relative to other panels of a plurality of panels.

Figure 8:
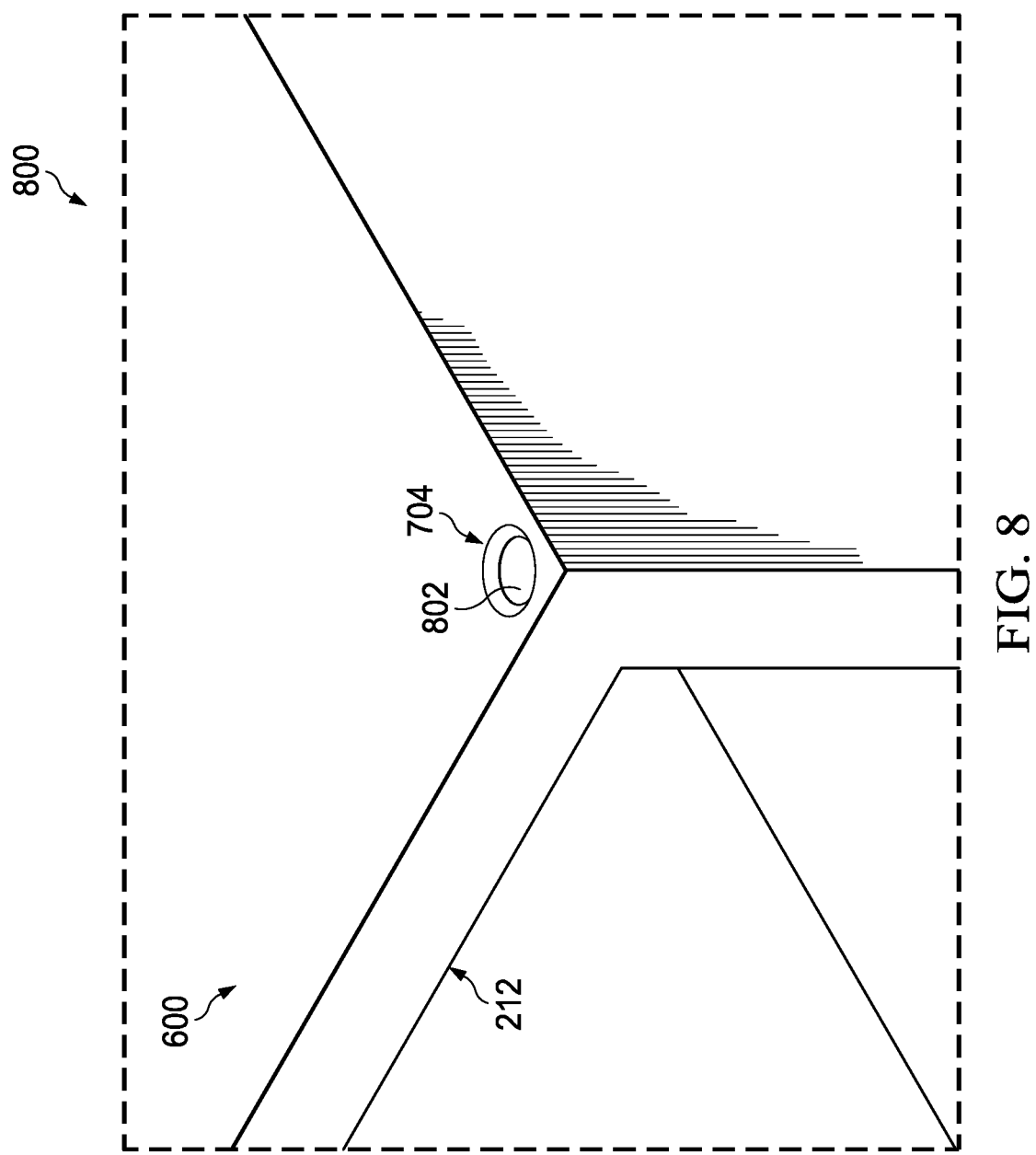
FIG. 8 is an illustration of an interior perspective view of an indexing feature of a transportation assembly in accordance with an illustrative embodiment.

Turning now to FIG. 8, an illustration of a bottom perspective view of an indexing feature of a transportation assembly is depicted in accordance with an illustrative embodiment. View 800 is a view within the box labeled FIG. 8 within FIG. 7. FIG. 8 is an interior out perspective view of a portion of crown panel carrier 212 of FIG. 6.

View 800 is a bottom perspective view of indexing feature 802. Indexing feature 802 is one of indexing features 704 of crown panel carrier 212. Indexing feature 802 is configured to index crown panel carrier 212 relative to side panel carrier 210 of FIG. 2.

In this illustrative example, indexing feature 802 takes the form of a "cup". A "cone" of another panel carrier, such as indexing feature 402 of side panel carrier 210 of FIG. 2, is mated with the cone, indexing feature 802. When indexing feature 802 mates with a cone, alignment between the two panel carriers is within tolerance.

In some illustrative examples, additional indexing features (not depicted) are present on crown panel carrier 212 or another panel carrier of plurality of panel carriers 202 to index plurality of panel carriers 202 to a second plurality of panel carriers. In some illustrative examples, indexing features to index plurality of panel carriers 202 to a second plurality of panel carriers comprises a number of cup and cone systems.

In some illustrative examples, indexing features 704 including indexing feature 802 have at least one a different location, a different size, or a different type of indexing feature. For example, at least one indexing feature of indexing features 704 can be mounted as a cantilevered structure. In one example, at least one of a location, a size, or a type of indexing feature is selected to accommodate manufacturing operations to be performed on the plurality of panels. In one example, at least one of a location, a size, or a type of indexing feature is selected to accommodate forming longitudinal joints between the plurality of panels.

Figure 9:
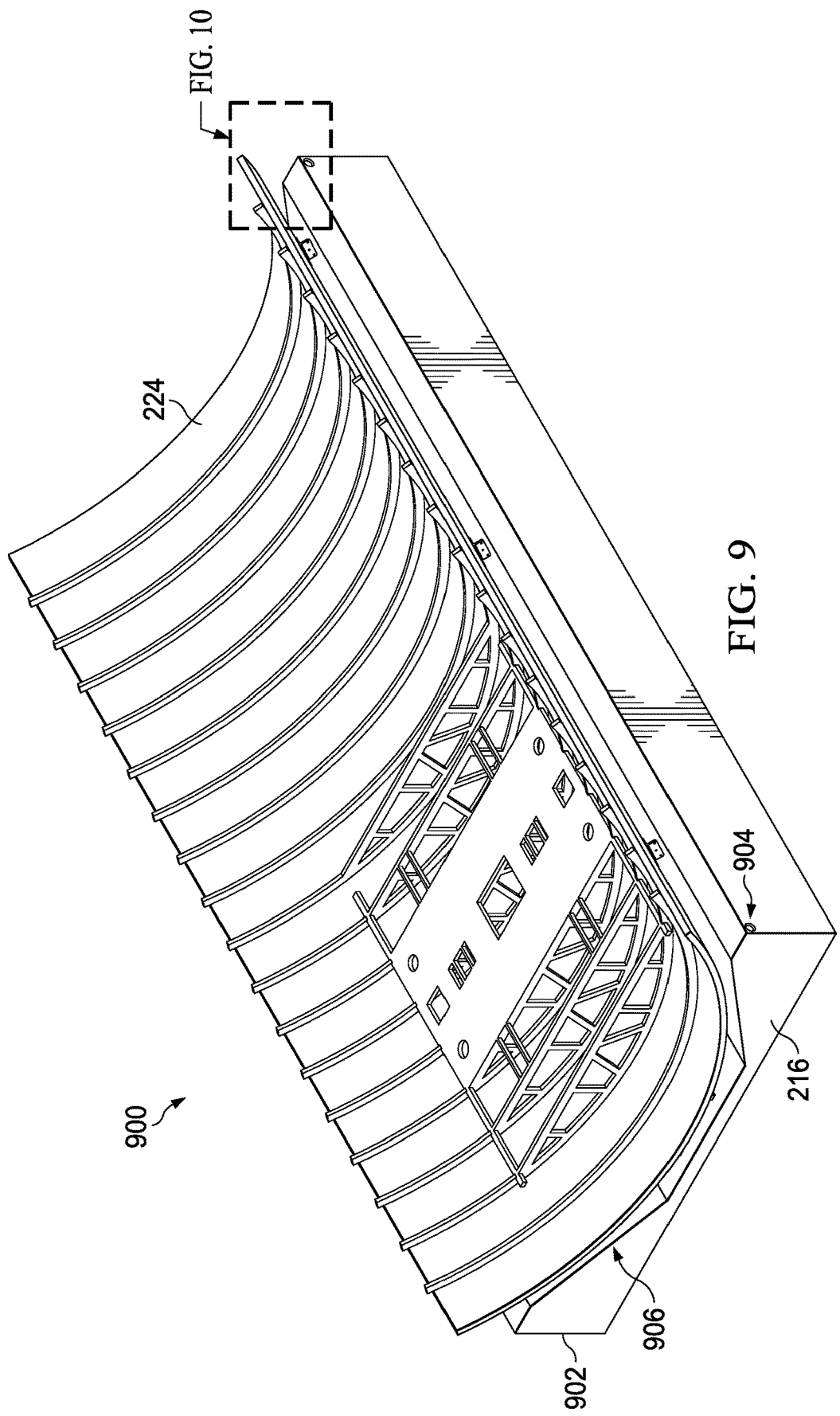
FIG. 9 is an illustration of an interior perspective view of a transportation assembly in accordance with an illustrative embodiment.

Turning now to FIG. 9, an illustration of a top perspective view of a transportation assembly is depicted in accordance with an illustrative embodiment. Transportation assembly 900 is a physical implementation of keel assembly 1336 of FIG. 13. Transportation assembly 900 comprises keel panel carrier 216 of FIG. 2 and keel panel 224.

Transportation assembly 900 is configured to support keel panel 224 during transportation. Following transportation, transportation assembly 900 is used to index keel panel 224 relative to other panels of a plurality of panels, such as plurality of panels 206 of FIG. 2. After joining keel panel carrier 216 to other panel carriers to form a carrier and operational frame system, such as carrier and operational frame system 200, keel panel carrier 216 supports keel panel 224 as manufacturing operations are performed through the carrier and operational frame system.

Keel panel carrier 216 comprises frame 902 and indexing features 904. Frame 902 is configured to act as strongback 906 to keel panel 224. Indexing features 904 are configured to index keel panel carrier 216 to other panel carriers prior to connecting keel panel carrier 216 to the other panel carriers to form a carrier and operational frame system, such as carrier and operational frame system 200 of FIG. 2. By indexing keel panel carrier 216 to other panel carriers, keel panel 224 is indexed relative to other panels of a plurality of panels.

Figure 10:
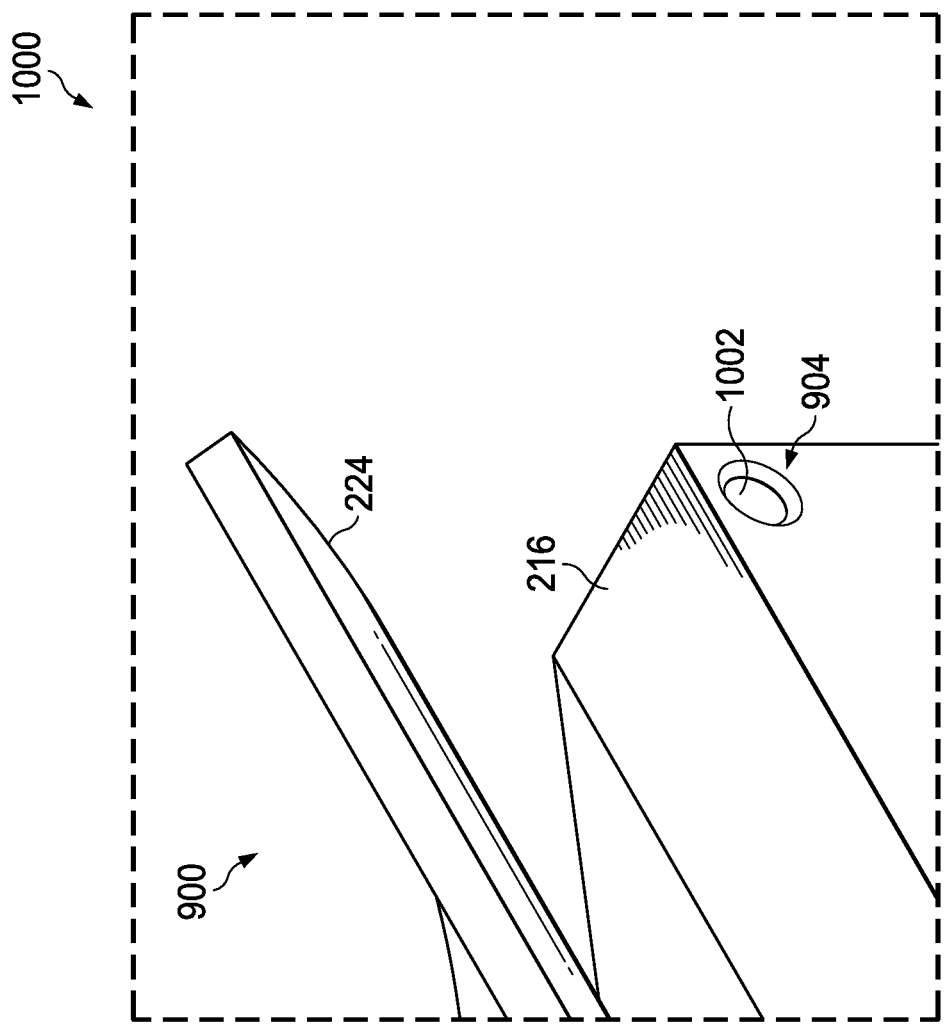
FIG. 10 is an illustration of an interior perspective view of an indexing feature of a transportation assembly in accordance with an illustrative embodiment.

Turning now to FIG. 10, an illustration of a top perspective view of an indexing feature of a transportation assembly is depicted in accordance with an illustrative embodiment. View 1000 is a view within the box labeled FIG. 10 within FIG. 9.

View 1000 is a front perspective view of indexing feature 1002. Indexing feature 1002 is one of indexing features 904 of keel panel carrier 216. Indexing feature 1002 is configured to index keel panel carrier 216 relative to side panel carrier 214 of FIG. 2.

In this illustrative example, indexing feature 1002 takes the form of a "cup". A "cone" of another panel carrier, such as an indexing feature of side panel carrier 214 of FIG. 2, is mated with the cone, indexing feature 1002. When indexing feature 1002 mates with a cone, alignment between the two panel carriers is within tolerance.

As depicted, indexing feature 1002 is a female feature, but indexing feature 1002 can take any desirable form. In some illustrative examples indexing feature 1002 is used to initially align keel panel carrier 216 prior to performing more controlled adjustments in position.

Figure 11:
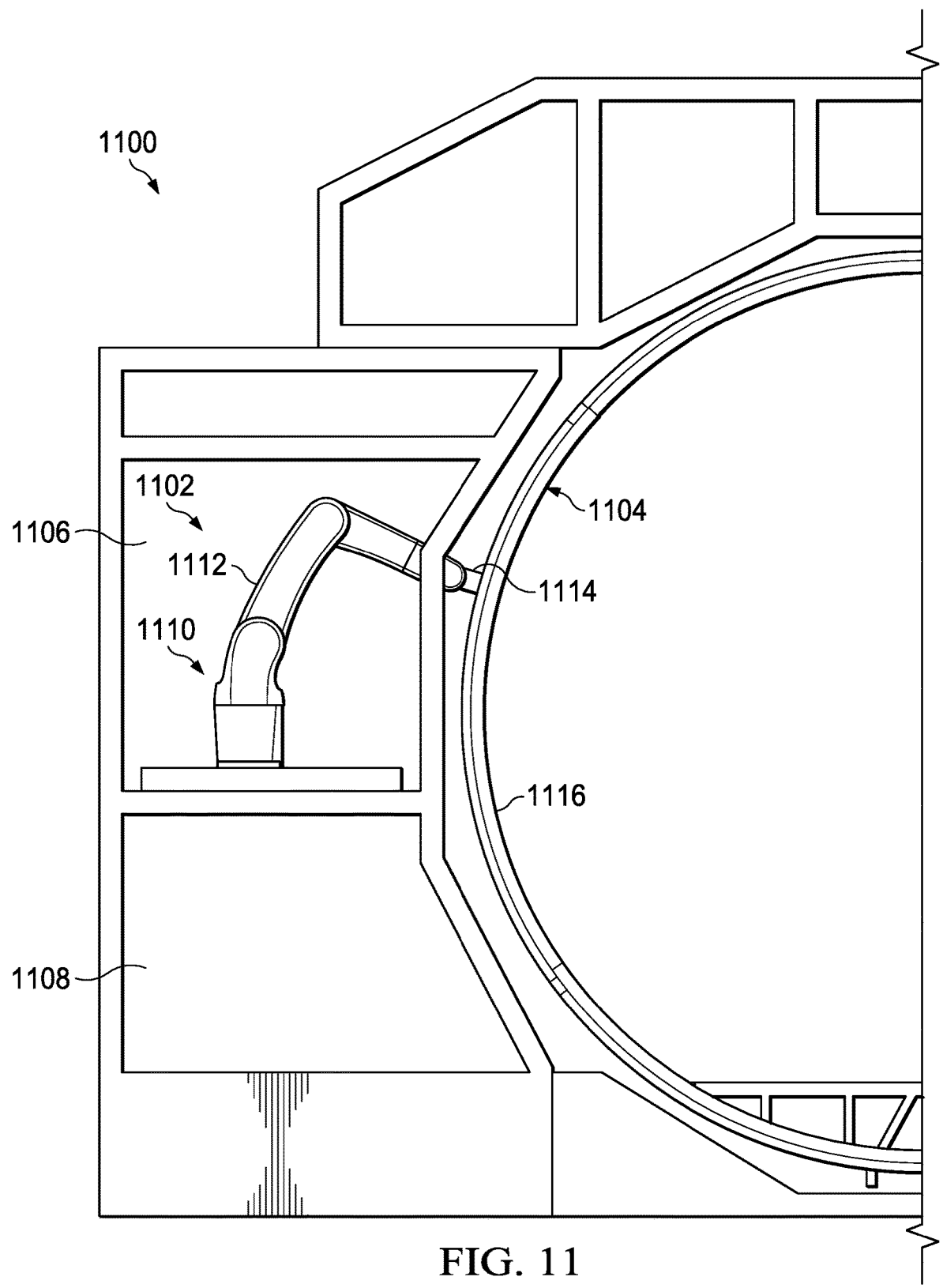
FIG. 11 is an illustration of a partial end view of an operational assembly within a carrier and operational frame system surrounding a plurality of panels in accordance with an illustrative embodiment.

Turning now to FIG. 11, an illustration of a partial end view of an operational assembly within a carrier and operational frame system surrounding a plurality of panels is depicted in accordance with an illustrative embodiment. Carrier and operational frame system 1100 is a physical implementation of carrier and operational frame system 1300 of FIG. 13. In some illustrative examples, carrier and operational frame system 1100 is the same as carrier and operational frame system 200 of FIG. 2, with a number of operational assemblies attached to carrier and operational frame system 200. For example, operational assembly 1110 is present in operational location 1106 of carrier and operational frame system 1100. In these illustrative examples, FIG. 11 is a partial end view of carrier and operational frame system 200 of FIG. 2.

Carrier and operational frame system 1100 comprises number of operational locations 1102. Number of operational locations 1102 provide access to plurality of panels 1104 to perform manufacturing operations on plurality of panels 1104.

Number of operational locations 1102 includes operational location 1106 and operational location 1108. In this illustrative example, operational assembly 1110 is present in operational location 1106. Operational assembly 1110 has robotic arm 1112. Operational assembly 1110 is an exchangeable module. Robotic arm 1112 maneuvers robotic end effector 1114 to perform manufacturing operations on side panel 1116 of plurality of panels 1104.

The illustration of carrier and operational frame system 1100 and plurality of panels 1104 in FIG. 11 is not meant to imply physical or architectural limitations to the manner in which an illustrative embodiment may be implemented. Other components in addition to or in place of the ones illustrated may be used. Some components may be unnecessary. For example, although plurality of panels 1104 is depicted without stringers or frames, in some illustrative examples these components are present. As another example, carrier and operational frame system 1100 can contain any desirable quantity or shape of panel carriers. As another example, any desirable type of operational assembly can be provided. In some illustrative examples, operational assembly 1110 is exchanged for an operational assembly configured to perform a different function.

Figure 12:
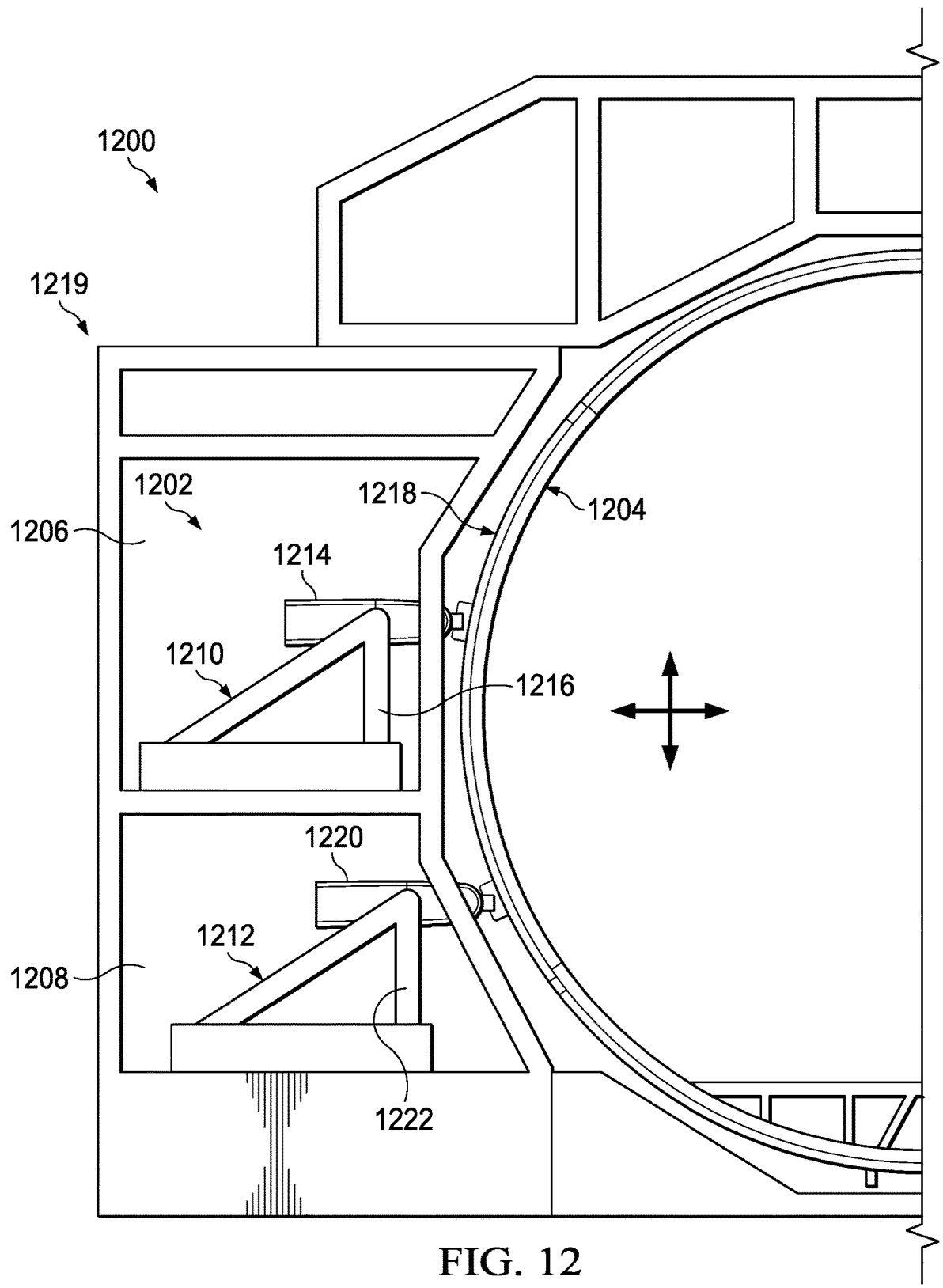
FIG. 12 is an illustration of a side view of operational assemblies within a carrier and operational frame system surrounding a plurality of panels in accordance with an illustrative embodiment.

Turning now to FIG. 12, an illustration of a side view of operational assemblies within a carrier and operational frame system surrounding a plurality of panels is depicted in accordance with an illustrative embodiment. Carrier and operational frame system 1200 is a physical implementation of carrier and operational frame system 1300 of FIG. 13.

Carrier and operational frame system 1200 comprises number of operational locations 1202. Number of operational locations 1202 provide access to plurality of panels 1204 to perform manufacturing operations on plurality of panels 1204.

Number of operational locations 1202 includes operational location 1206 and operational location 1208. In this illustrative example, operational assembly 1210 is present in operational location 1206 and operational assembly 1212 is present in operational location 1208. Operational assembly 1210 has panel manipulative arm 1214 and railing 1216. Panel manipulative arm 1214 is used to adjust positioning of side panel 1218. Railing 1216 is present to create a boundary and restraint for human operators. Operational assembly 1210 is an exchangeable module.

Operational assembly 1212 has panel manipulative arm 1220 and railing 1222. Panel manipulative arm 1220 is used to adjust positioning of side panel 1218. Railing 1222 is present to create a boundary and restraint for human operators. Operational assembly 1212 is an exchangeable module.

Panel manipulative arm 1220 and panel manipulative arm 1214 move side panel 1218 relative to side panel carrier 1219 of carrier and operational frame system 1200. Movement of side panel 1218 may include movement towards or away from side panel carrier 1219, up or down relative to side panel carrier 1219, left or right relative to side panel carrier 1219, or any desirable combination. Movement of side panel 1218 up or down relative to side panel carrier 1219 moves side panel 1218 towards or away from a crown panel. Movement of side panel 1218 left or right relative to side panel carrier 1219 moves side panel 1218 in the fore/aft (longitudinal) direction of a fuselage.

Panel manipulative arm 1220 and panel manipulative arm 1214 are connected to temporary fittings of side panel 1218. Panel manipulative arm 1220 and panel manipulative arm 1214 move side panel 1218 in any desirable axes relative to side panel carrier 1219.

As depicted, side panel 1218 has been indexed to crown panel 1224. At least one of forming carrier and operational frame system 1200 by joining the plurality of panel carriers together or moving panel manipulative arm 1220 and panel manipulative arm 1214 positions side panel 1218 relative to crown panel 1224 within a desired tolerance.

The illustration of carrier and operational frame system 1200 and plurality of panels 1204 in FIG. 12 is not meant to imply physical or architectural limitations to the manner in which an illustrative embodiment may be implemented. Other components in addition to or in place of the ones illustrated may be used. Some components may be unnecessary. For example, although plurality of panels 1204 is depicted without stringers or frames, in some illustrative examples these components are present. As another example, carrier and operational frame system 1200 can contain any desirable quantity or shape of panel carriers.

As another example, although only panel manipulative arm 1214 and panel manipulative arm 1220 are visible in FIG. 12, additional panel manipulative arms can be present in operational frame system 1200. For example, additional panel manipulative arms can be present moving into the page in FIG. 12. In this illustrative example, additional panel manipulative arms are present along the length of plurality of panels 1204.

Figure 13:
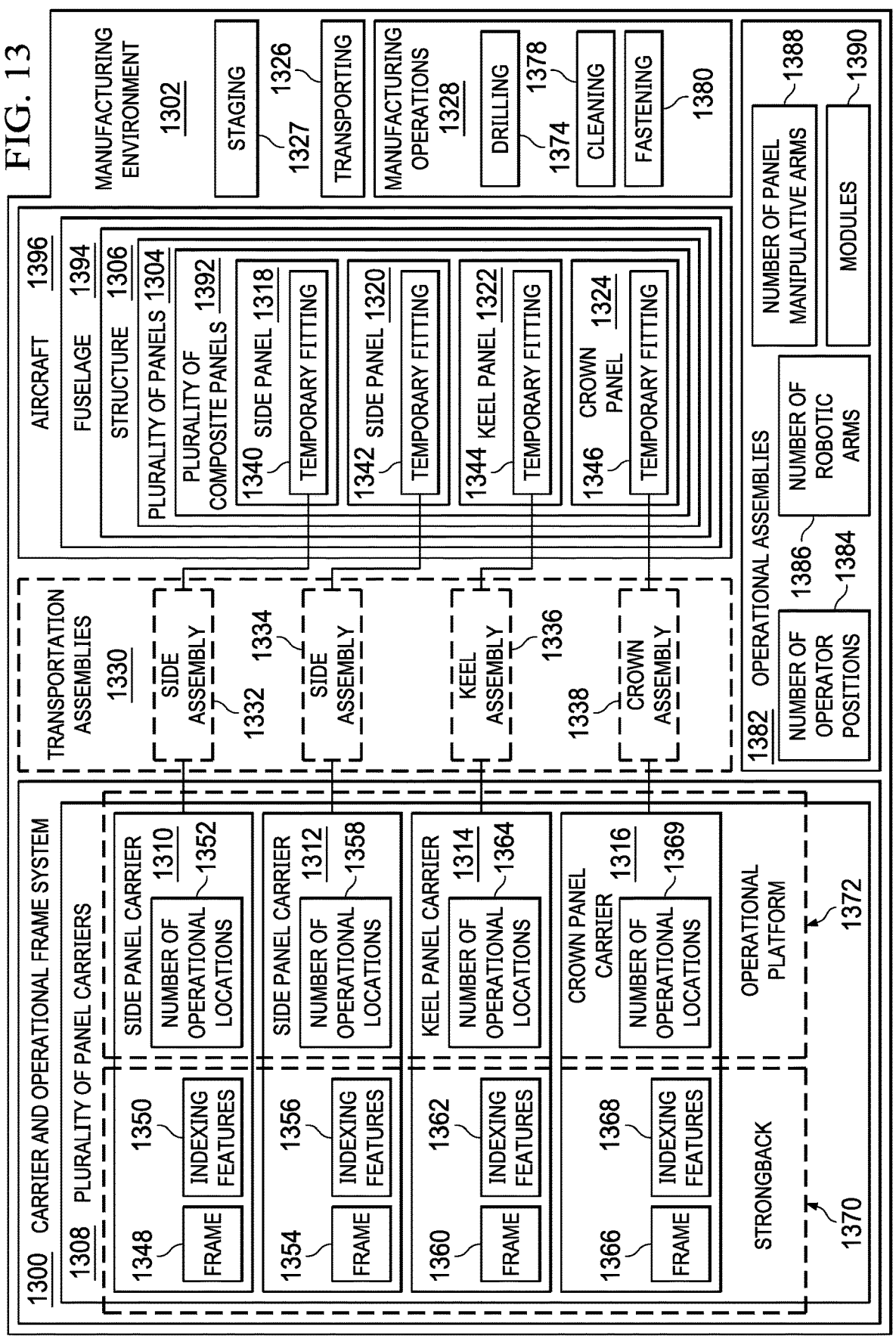
FIG. 13 is an illustration of a block diagram of a manufacturing environment in which an illustrative embodiment may be implemented.

Turning now to FIG. 13, an illustration of a block diagram of a manufacturing environment is depicted in which an illustrative embodiment may be implemented. Carrier and operational frame system 1300 is present in manufacturing environment 1302. Carrier and operational frame system 1300 is configured to support plurality of panels 1304 while assembling structure 1306.

Carrier and operational frame system 1300 comprises plurality of panel carriers 1308, each panel carrier comprising a frame configured to act as a strongback to a panel and indexing features configured to interface with at least one other panel carrier of plurality of panel carriers 1308. Plurality of panel carriers 1308 comprises any desirable quantity of panel carriers. In this illustrative example, plurality of panel carriers 1308 includes four panel carriers: side panel carrier 1310, side panel carrier 1312, keel panel carrier 1314, and crown panel carrier 1316. In some illustrative examples, plurality of panel carriers 1308 includes more than four panel carriers. In some other illustrative examples, plurality of panel carriers 1308 includes fewer than four panel carriers.

Each panel carrier of plurality of panel carriers 1308 is configured to support a respective panel during transporting 1326, staging 1327, and manufacturing operations 1328. In this illustrative example, plurality of panels 1304 includes side panel 1318, side panel 1320, keel panel 1322, and crown panel 1324. Plurality of panel carriers 1308 is configured to support plurality of panels 1304 during transporting 1326 of plurality of panels 1304. Plurality of panel carriers 1308 is also configured to support plurality of panels 1304 during manufacturing operations 1328.

Side panel carrier 1310 is configured to support side panel 1318 during transporting 1326 and manufacturing operations 1328. Side panel carrier 1312 is configured to support side panel 1320 during transporting 1326 and manufacturing operations 1328. Keel panel carrier 1314 is configured to support keel panel 1322 during transporting 1326 and manufacturing operations 1328. Crown panel carrier 1316 is configured to support crown panel 1324 during transporting 1326 and manufacturing operations 1328.

Each of plurality of panels 1304 is secured to a respective panel carrier of plurality of panel carriers 1308 to form transportation assemblies 1330. Transportation assemblies 1330 are transported to manufacturing environment 1302 prior to performing manufacturing operations 1328. Transporting 1326 can also be referred to as shipping. Transporting 1326 transportation assemblies 1330 can occur within manufacturing environment 1302 or from a location outside of manufacturing environment 1302. Transporting 1326 can include shipping within a manufacturing facility, shipping within a city, shipping within a state, shipping between states, or shipping between countries. Plurality of panel carriers 1308 is configured to support plurality of panels 1304 during transporting 1326.

In this illustrative example, transportation assemblies 1330 includes side assembly 1332, side assembly 1334, keel assembly 1336, and crown assembly 1338. Side panel 1318 is secured to side panel carrier 1310 to form side assembly 1332. Side panel 1320 is secured to side panel carrier 1312 to form side assembly 1334. Keel panel 1322 is secured to keel panel carrier 1314 to form keel assembly 1336. Crown panel 1324 is secured to crown panel carrier 1316 to form crown assembly 1338.

In some illustrative examples, each of plurality of panels 1304 is attached to a respective panel carrier of plurality of panel carriers 1308 using a respective temporary fitting to form transportation assemblies 1330. In this illustrative example, side panel 1318 is attached to side panel carrier 1310 using temporary fitting 1340. In this illustrative example, side panel 1320 is attached to side panel carrier 1312 using temporary fitting 1342. In this illustrative example, keel panel 1322 is attached to keel panel carrier 1314 using temporary fitting 1344. In this illustrative example, crown panel 1324 is attached to crown panel carrier 1316 using temporary fitting 1346.

Prior to attaching a panel of plurality of panels 1304 to a respective panel carrier, the panel is indexed to the respective panel carrier. Indexing each of the plurality of panels to a respective panel carrier of plurality of panel carriers 1308 allows for each of plurality of panels 1304 to be indexed once. Indexing each of the plurality of panels to a respective panel carrier of plurality of panel carriers 1308 allows for alignment of plurality of panel carriers 1308 relative to each other to also align plurality of panels 1304 relative to each other.

Side panel carrier 1310 has frame 1348 and indexing features 1350. Frame 1348 is configured to act as a strongback to side panel 1318. Indexing features 1350 are configured to interface with at least one other panel carrier of plurality of panel carriers 1308. Side panel carrier 1310 has number of operational locations 1352. Each of number of operational locations 1352 is configured to receive a respective operational assembly of operational assemblies 1382. Each of number of operational locations 1352 is configured to allow manufacturing operations 1328 to be performed on at least one panel of plurality of panels 1304. In some illustrative examples, each of number of operational locations 1352 is configured to allow at least one of manufacturing operations 1328 to be performed on side panel 1318.

Side panel carrier 1312 has frame 1354 and indexing features 1356. Frame 1354 is configured to act as a strongback to side panel 1320. Indexing features 1356 are configured to interface with at least one other panel carrier of plurality of panel carriers 1308. Side panel carrier 1312 has number of operational locations 1358. Each of number of operational locations 1358 is configured to receive a respective operational assembly of operational assemblies 1382. Each of number of operational locations 1358 is configured to allow manufacturing operations 1328 to be performed on at least one panel of plurality of panels 1304. In some illustrative examples, each of number of operational locations 1358 is configured to allow at least one of manufacturing operations 1328 to be performed on side panel 1320.

Keel panel carrier 1314 has frame 1360 and indexing features 1362. Frame 1360 is configured to act as a strongback to keel panel 1322. Indexing features 1362 are configured to interface with at least one other panel carrier of plurality of panel carriers 1308. Keel panel carrier 1314 has number of operational locations 1364. Each of number of operational locations 1364 is configured to receive a respective operational assembly of operational assemblies 1382. Each of number of operational locations 1364 is configured to allow manufacturing operations 1328 to be performed on at least one panel of plurality of panels 1304. In some illustrative examples, each of number of operational locations 1364 is configured to allow at least one of manufacturing operations 1328 to be performed on keel panel 1322.

Crown panel carrier 1316 has frame 1366 and indexing features 1368. Frame 1366 is configured to act as a strongback to crown panel 1324. Indexing features 1368 are configured to interface with at least one other panel carrier of plurality of panel carriers 1308. Crown panel carrier 1316 has number of operational locations 1369. Each of number of operational locations 1369 is configured to receive a respective operational assembly of operational assemblies 1382. Each of number of operational locations 1369 is configured to allow manufacturing operations 1328 to be performed on at least one panel of plurality of panels 1304. In some illustrative examples, each of number of operational locations 1369 is configured to allow at least one of manufacturing operations 1328 to be performed on crown panel 1324.

Transportation assemblies 1330 comprising plurality of panel carriers 1308 each holding a panel of plurality of panels 1304 is received in manufacturing environment 1302. After receiving transportation assemblies 1330, plurality of panel carriers 1308 is connected to form operational platform 1372 around plurality of panels 1304. Manufacturing operations 1328 are performed on plurality of panels 1304 using operational platform 1372. At least one of manufacturing operations 1328 is performed on at least one panel of plurality of panels 1304 through operational platform 1372.

Operational platform 1372 acts as a jig for plurality of panels 1304. Operational platform 1372 acting as a jig holds plurality of panels 1304 and provides locations for tools to work on plurality of panels 1304.

By indexing each panel of plurality of panels 1304 to a respective panel carrier of plurality of panel carriers 1308 with a desirable threshold, plurality of panel carriers 1308 now acts to align plurality of panels 1304 on a macro level. Indexing each panel to a respective panel carrier eliminates indexing the panels directly to each other on the macro level. A macro level may be described as a rough indexing, while a micro level indexing is a more precise indexing.

In some illustrative examples, macro level indexing is described as precise indexing and contact of corresponding panel carriers with a rough positioning of panels relative to and having no contact to its corresponding panel. In some illustrative examples, micro level indexing is described as precise indexing and contact of corresponding panels.

Forming operational platform 1372 acts to index plurality of panels 1304 relative to each other. Number of panel manipulative arms 1388 can be used to perform micro indexing of plurality of panels 1304 prior to joining plurality of panels 1304.

Number of panel manipulative arms 1388 will maintain the new location of plurality of panels 1304. When plurality of panels 1304 are positioned within tolerance relative to each other, plurality of panels 1304 are joined using longitudinal splices.

Plurality of panel carriers 1308 joined together forms strongback 1370 for plurality of panels 1304. Strongback 1370 supports plurality of panels 1304 during manufacturing operations 1328.

Manufacturing operations 1328 include any desirable operations. Manufacturing operations 1328 can include drilling 1374, cleaning 1378, fastening 1380, or any other desirable operations. In some illustrative examples, performing at least one manufacturing operation on at least one panel comprises fastening 1380 plurality of panels 1304 together.

A manufacturing operation of manufacturing operations 1328 is performed through at least one of plurality of panel carriers 1308. A manufacturing operation is performed through one of number of operational locations 1352 or number of operational locations 1358.

Number of operational locations 1352 is configured to receive a respective operational assembly of operational assemblies 1382. Number of operational locations 1358 is configured to receive a respective operational assembly of operational assemblies 1382.

Operational assemblies 1382 are configured to enable manufacturing operations 1328 on plurality of panels 1304. Operational assemblies 1382 are configured to enable performance of a manufacturing operation of manufacturing operations 1328 from an operational location of either number of operational locations 1352 or number of operational locations 1358.

Operational assemblies 1382 can enable performance of a manufacturing operation either manually or autonomously. Operational assemblies 1382 can include at least one of number of operator positions 1384, number of robotic arms 1386, or number of panel manipulative arms 1388.

Number of operator positions 1384 provide locations for operators to perform a manufacturing operation on a panel of plurality of panels 1304. Number of operator positions 1384 provide desirable structures, such as railings, stairs, or any other desirable structures to enable performance of a manufacturing operation from number of operator positions 1384.

In some illustrative examples, number of robotic arms 1386 perform at least one manufacturing operation on a panel using a robotic end effector. The robotic end effector is connected to number of robotic arms 1386. In some illustrative examples, number of panel manipulative arms 1388 can move a respective panel of plurality of panels 1304 to position the respective panel in a desirable location to receive a manufacturing operation. In some illustrative examples, number of panel manipulative arms 1388 can move a respective panel of plurality of panels 1304 to bring a respective panel of plurality of panels 1304 to a desired manufacturing position prior to drilling and/or fastening plurality of panels 1304.

In some illustrative examples, operational assemblies 1382 are secured to an operational location using modular connectors. In some illustrative examples, operational assemblies 1382 are exchangeable modules 1390. Exchangeable modules 1390 can be removed and replaced by another of operational assemblies 1382. Exchangeable modules 1390 can be removed from plurality of panel carriers 1308 and secured within another carrier and operational frame system with another plurality of panel carriers.

Number of operational locations 1352, number of operational locations 1358, and operational assemblies 1382 configured to interface with a respective operational location provide the ability to change the design of structure 1306 without an undesirable amount of tooling redesign. Carrier and operational frame system 1300 provides flexibility in providing types of operations and locations of operations on structure 1306 without redesigning carrier and operational frame system 1300.

Plurality of panels 1304 are formed of any desirable material. In some illustrative examples, plurality of panels 1304 takes the form of plurality of composite panels 1392. Composite panels 1392 are formed of a composite material. A composite material includes reinforcing fibers bound in a polymer resin matrix. In other illustrative examples, plurality of panels 1304 is formed of at least one metal.

Structure 1306 is any desirable type of structure. In some illustrative examples, structure 1306 is a fuselage 1394 of aircraft 1396 or a portion of fuselage 1394.

The illustration of manufacturing environment 1302 in FIG. 13 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of panel carriers 1308 can include greater than or fewer than four panel carriers. As another example, structure 1306 can be at least a portion of a tank, a boat, a car, a building, or any other desirable type of structure.

As yet another example, manufacturing operations 1328 may include other operations not depicted in FIG. 13 such as coating application, routing, inspection, or any other desirable type of operation. As another example, although each of side panel carrier 1310, side panel carrier 1312, keel panel carrier 1314, and crown panel carrier 1316 include operational locations, in other illustrative examples, at least one of side panel carrier 1310, side panel carrier 1312, or keel panel carrier 1314 does not include a number of operational locations. In some illustrative examples, at least one of keel panel carrier 1314 or crown panel carrier 1316 does not have a number of operational locations.

The different components shown in FIGS. 1-12 may be combined with components in FIG. 13, used with components in FIG. 13, or a combination of the two. Additionally, some of the components in FIGS. 1-12 may be illustrative examples of how components shown in block form in FIG. 13 may be implemented as physical structures.

Figure 14:
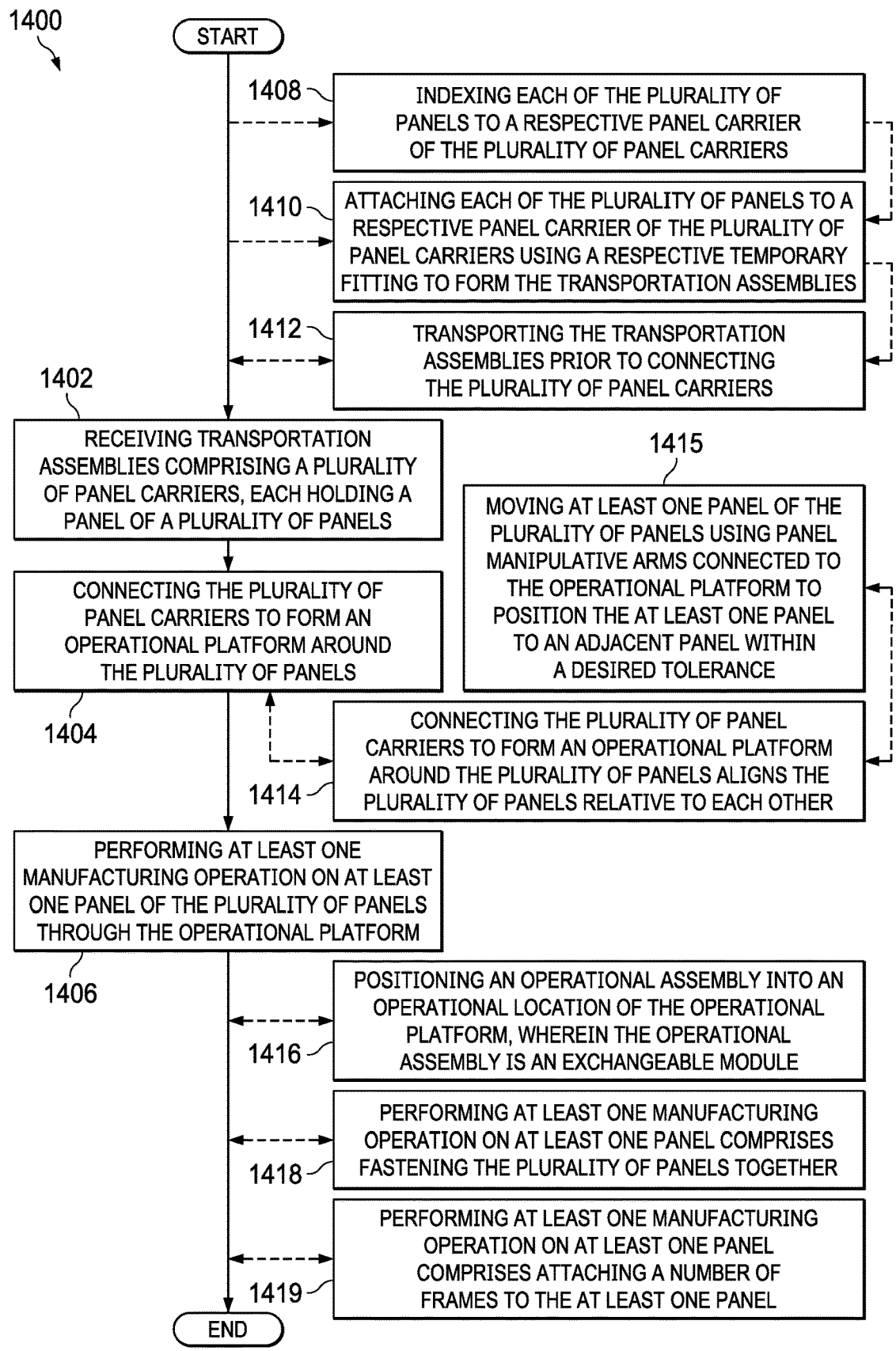
FIG. 14 is an illustration of a flowchart of a method of assembling a structure in accordance with an illustrative embodiment.

Turning now to FIG. 14, an illustration of a flowchart of a method of assembling a structure is depicted in accordance with an illustrative embodiment. In some illustrative examples, method 1400 assembles a portion of a fuselage of aircraft 100 of FIG. 1. In some illustrative examples, method 1400 is implemented using plurality of panel carriers 1308 of FIG. 13. In some illustrative examples, method 1400 is implemented using plurality of panel carriers 202 of FIGS. 2-10.

Method 1400 receives transportation assemblies comprising a plurality of panel carriers, each holding a panel of a plurality of panels (operation 1402). Method 1400 connects the plurality of panel carriers to form an operational platform around the plurality of panels (operation 1404). The operational platform acts as a jig for the plurality of panels. The operational platform acting as a jig holds the plurality of panels and provides locations for tools to work on the plurality of panels. Method 1400 performs at least one manufacturing operation on at least one panel of the plurality of panels through the operational platform (operation 1406). Afterwards, method 1400 terminates.

In some illustrative examples, method 1400 indexes each of the plurality of panels to a respective panel carrier of the plurality of panel carriers (operation 1408). For example, side panel 218 of FIG. 2 is indexed to side panel carrier 210. As another example, crown panel 220 of FIG. 2 is indexed to crown panel carrier 212. By indexing a panel to a panel carrier, indexing the panel carrier to other panel carriers aligns the panel to other panels on the panel carriers.

In these illustrative examples, when the panel is placed on the panel carrier, it is indexed to the panel carrier. By indexing the panel to the panel carrier with a desirable threshold, the panel carrier now acts to align the plurality of panels on a macro level when the plurality of panels is joined into the fuselage. Indexing each panel to a respective panel carrier eliminates indexing the panels directly to each other on the macro level. A macro level may be described as a rough indexing, while a micro level indexing is a more precise indexing. In some illustrative examples, the macro level is described in feet or a fraction of a foot, while the micro level is described in inches or even fractions of inches.

In some illustrative examples, method 1400 attaches each of the plurality of panels to a respective panel carrier of the plurality of panel carriers using a respective temporary fitting to form the transportation assemblies (operation 1410). In some illustrative examples, attaching a panel to a respective panel carrier is performed after fabrication of the panel is completed. In some illustrative examples, some fabrication steps are performed on a panel after attaching the panel to the respective panel carrier and prior to connecting the plurality of panel carriers to form the operational platform.

In some illustrative examples, method 1400 transports the transportation assemblies prior to connecting the plurality of panel carriers (operation 1412). Transporting the transportation assemblies involves moving the transportation assemblies. In some illustrative examples, a transportation assembly is transported within a manufacturing facility. In some illustrative examples, a transportation assembly is transported across a city, a state, a country, or even between countries. The transportation assemblies secure and protect the panels during transportation of the panels.

In some illustrative examples, connecting the plurality of panel carriers to form an operational platform around the plurality of panels aligns the plurality of panels relative to each other (operation 1414). In these illustrative examples, indexing steps are reduced. By reducing indexing and aligning steps, manufacturing time is reduced.

In these illustrative examples, the panels have been indexed to the plurality of panel carriers, as in operation 1408. The plurality of panel carriers is then aligned relative to each other using indexing features, such as indexing features 1350, indexing features 1356, indexing features 1362, and indexing features 1368. Aligning the plurality of panel carriers relative to each other aligns the plurality of panels on a macro level. In some illustrative examples, the plurality of panels is then adjusted using a number of panel manipulative arms to index the plurality of panels on a micro level. In some illustrative examples, method 1400 moves at least one panel of the plurality of panels using panel manipulative arms connected to the operational platform to position the at least one panel relative to an adjacent panel within a desired tolerance (operation 1415). The desired tolerance is a tolerance for joining the adjacent panels together. The panel manipulative arms can be used to manipulate the loft of the plurality of panels to position the plurality of panels at a desired three-dimensional inner mold line (IML) or outer mold line (OML) position.

A macro level may be described as a rough indexing, while a micro level indexing is a more precise indexing. In some illustrative examples, the macro level is described in feet or a fraction of a foot, while the micro level is described in inches or even fractions of inches.

Indexing the plurality of panels on a micro level includes moving each panel of the plurality of panels in any desirable axis. Movement of a panel may include movement towards or away from a respective panel carrier, up or down relative to a panel carrier, left or right relative to a panel carrier, or any desirable combination. In some illustrative examples, panel manipulative arms in the operational platform are connected to temporary fittings of at least one panel. The panel manipulative arms move the panel in any desirable axes relative to the respective panel carrier.

Each panel manipulative arm moves a panel to adjust its position relative to an adjacent panel. The panel manipulative arm moves the panel to place the edge of the panel within tolerance of the edge of an adjacent panel for joining the two panels. After indexing and alignment have been completed, the plurality of panels is joined. The plurality of panels is joined using longitudinal joints such that the plurality of panels is spliced together along longitudinal edges. The plurality of panels is then splicing together. A splice between two panels of the plurality of panels could be a lap joint, a butt joint with longitudinal inner and/or outer splice plates or any other desirable other type of splice.

In some illustrative examples, method 1400 positions an operational assembly into an operational location of the operational platform, wherein the operational assembly is an exchangeable module (operation 1416). By having an exchangeable module, different operational equipment can be added or removed when desired. In one example, a manual operational assembly can be removed and replaced with an automated operational assembly. In one example, an operational assembly configured to perform one type of manufacturing operation is removed and replaced with an operational assembly configured to perform another type of manufacturing operation. In one illustrative example, a manufacturing operation includes splicing the plurality of panels. In one illustrative example, the manufacturing operation includes automatic splicing of a longitudinal splice with an apparatus such as a flex track.

In some illustrative examples, performing at least one manufacturing operation on at least one panel comprises fastening the plurality of panels together (operation 1418). In one illustrative example, the fastening includes automatic splicing of a longitudinal splice with an apparatus such as a flex track. In some illustrative examples, by fastening the plurality of panels together, the structure is assembled. In some illustrative examples, by fastening the plurality of panels together, a portion of a fuselage is formed. In some illustrative examples, the structure is a fuselage of an aircraft.

In some illustrative examples, the plurality of panels each has a respective number of frames prior to being joined together. In these illustrative examples, each of the frames will be joined (spliced) to a frame of an adjacent panel.

In some other illustrative examples, frames are attached to the plurality of panels after the plurality of panel carriers are joined. In some illustrative examples, performing at least one manufacturing operation on at least one panel comprises attaching a number of frames to the at least one panel (operation 1419).

Figure 15:
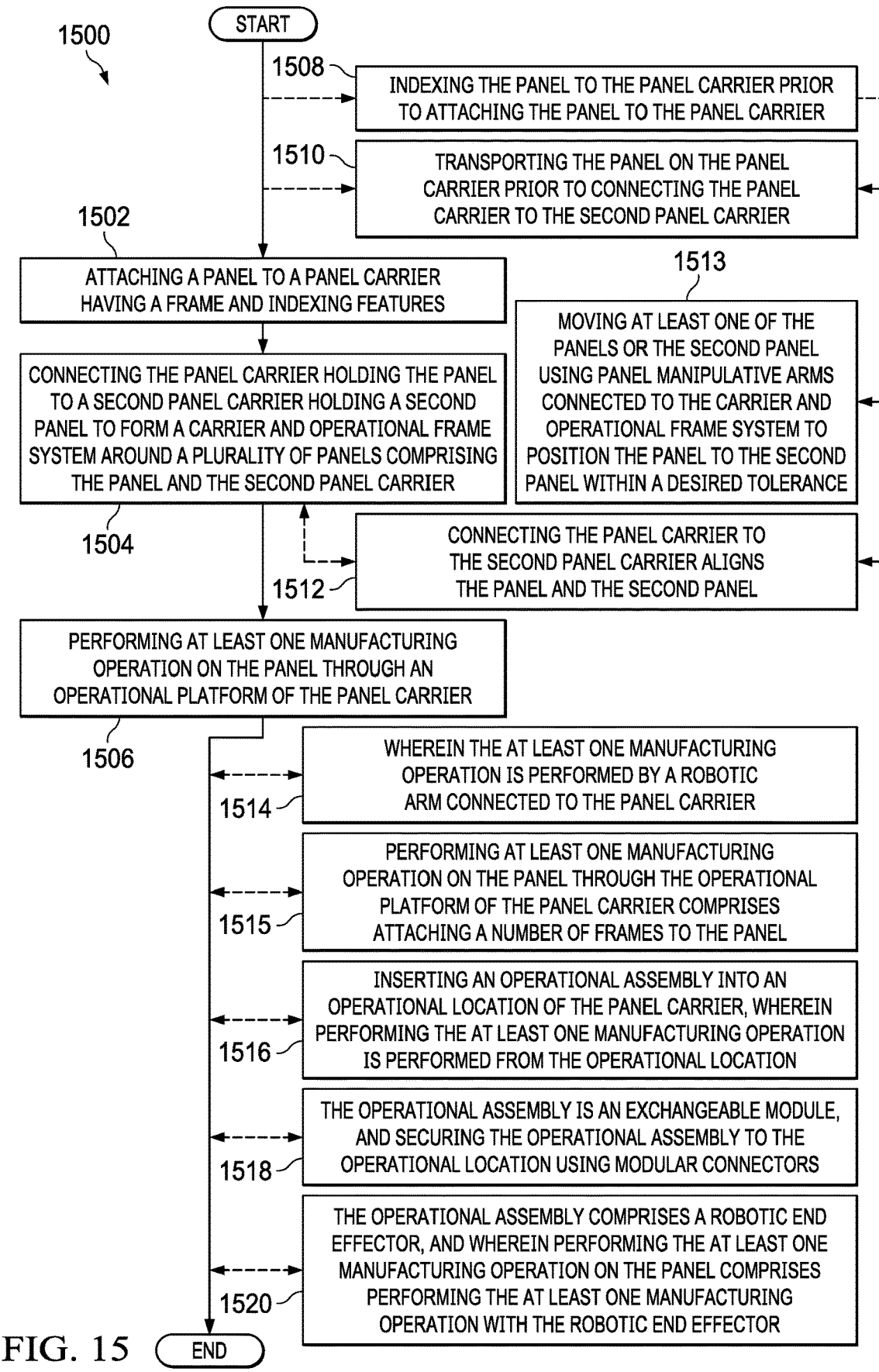
FIG. 15 is an illustration of a flowchart of a method of assembling a structure in accordance with an illustrative embodiment.

Turning now to FIG. 15, an illustration of a flowchart of a method of assembling a structure is depicted in accordance with an illustrative embodiment. In some illustrative examples, method 1500 assembles a portion of a fuselage of an aircraft. For example, method 1500 can assemble a barrel section of a fuselage. In some illustrative examples, method 1500 assembles a portion of body 106 of aircraft 100 of FIG. 1. For example, method 1500 can assemble a barrel section of body 106. In some illustrative examples, method 1500 is implemented using plurality of panel carriers 1308 of FIG. 13. In some illustrative examples, method 1500 is implemented using plurality of panel carriers 202 of FIGS. 2-10.

Method 1500 attaches a panel to a panel carrier having a frame and indexing features (operation 1502). Method 1500 connects the panel carrier holding the panel to a second panel carrier holding a second panel to form a carrier and operational frame system around a plurality of panels comprising the panel and the second panel carrier (operation 1504). Method 1500 performs at least one manufacturing operation on the panel through an operational platform of the panel carrier (operation 1506). Afterwards, method 1500 terminates.

In some illustrative examples, method 1500 indexes the panel to the panel carrier prior to attaching the panel to the panel carrier (operation 1508). By indexing the panel to the panel carrier, indexing the panel carrier to other panel carriers indexes the panel to other panels on the panel carriers.

In some illustrative examples, method 1500 transports the panel on the panel carrier prior to connecting the panel carrier to the second panel carrier (operation 1510). Transporting the panel on the panel carrier involves moving the transportation assemblies. In some illustrative examples, the panel on the panel carrier is transported within a manufacturing facility. In some illustrative examples, the panel on the panel carrier is transported across a city, a state, a country, or even between countries. The panel carrier secures and protects the panel during transportation of the panels.

In some illustrative examples, connecting the panel carrier to the second panel carrier aligns the panel and the second panel (operation 1512). The alignment of the panel and the second panel is at a macro level. This is a rough alignment. In some illustrative examples, method 1500 moves at least one of the panel or the second panel using panel manipulative arms connected to the carrier and operational frame system to position the panel relative to the second panel within a desired tolerance (operation 1513). The panel manipulative arms perform a micro alignment such that the panel and second panel are positioned within tolerance to be joined to each other. In some illustrative examples, the at least one manufacturing operation is performed by a robotic arm connected to the panel carrier (operation 1514).

In some illustrative examples, the plurality of panels each has a respective number of frames prior to being joined together. In these illustrative examples, each of the frames will be joined (spliced) to a frame of an adjacent panel.

In some other illustrative examples, frames are attached to the plurality of panels after the plurality of panel carriers are joined. In some illustrative examples, performing at least one manufacturing operation on the panel through the operational platform of the panel carrier comprises attaching a number of frames to the panel (operation 1515).

In some illustrative examples, method 1500 inserts an operational assembly into an operational location of the panel carrier, wherein performing the at least one manufacturing operation is performed from the operational location (operation 1516). In some illustrative examples, the operational assembly is inserted into the panel carrier after connecting the plurality of panel carriers to form an operational platform around the plurality of panels.

In some illustrative examples, the operational assembly is an exchangeable module, and method 1500 secures the operational assembly to the operational location using modular connectors (operation 1518). The operational assembly may be one of a manual operational assembly or an automated operational assembly. In one illustrative example, the operational assembly comprises structures for operators, such as railings or steps. In some illustrative examples, the operational assembly is exchanged for another operational assembly to perform additional manufacturing operations on the panel.

In some illustrative examples, the operational assembly comprises a robotic end effector, and wherein performing the at least one manufacturing operation on the panel comprises performing the at least one manufacturing operation with the robotic end effector (operation 1520). In some illustrative examples, the operational assembly comprises a robotic arm to manipulate the end effector.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1408 through operation 1418 may be optional. As another example, operation 1508 through operation 1520 may be optional.

Figure 16:
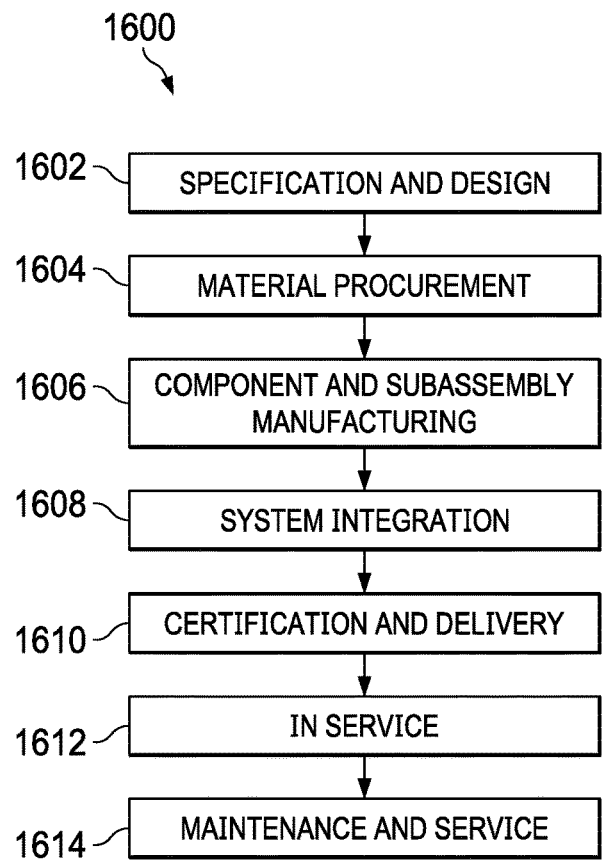
FIG. 16 is an illustration of an aircraft manufacturing and service method in a form of a block diagram in accordance with an illustrative embodiment.
Figure 17:
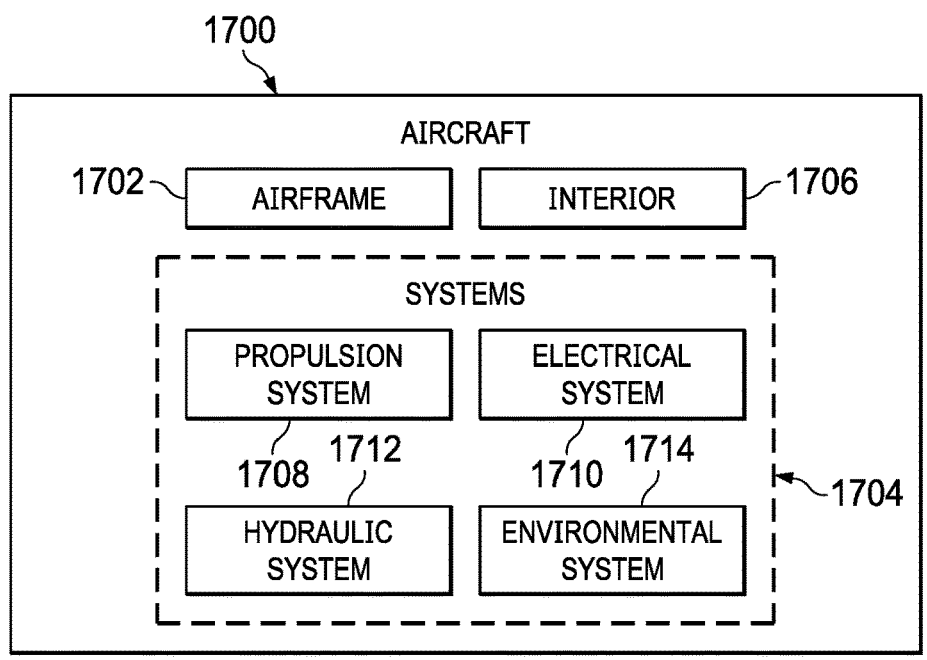
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1614 of FIG. 16. Aircraft 1700 can include structure 1306 of FIG. 13 formed by assembling plurality of panels 1304 using carrier and operational frame system 1300. Structure 1306 can be formed during component and subassembly manufacturing 1606. As an example, method 1400 can be used during component and subassembly manufacturing 1606 to assemble structure 1306. In some illustrative examples, structure 1306 is a component of aircraft 1700. As another example, method 1500 can be used during component and subassembly manufacturing 1606 to assemble structure 1306.

The illustrative examples present a set of tools, plurality of panel carriers, for panels which stay with the panels from shipping through completion. In some illustrative examples, the panels are fuselage panels and completion is fuselage body structures completion.

The plurality of panel carriers (tools) assemble around the shape of the structure to hold and support the panels until they are joined together. In some illustrative examples, the structure is a fuselage.

Each panel carrier of the plurality of panel carriers is a portion of a jig, carrier and operational frame system that provides both the operational platform and the strongback for the plurality of panels. Each panel carrier of the plurality of panel carriers is used to index the panel respective panel. Each of the plurality of panel carriers is connected into the jig, the carrier and operational frame system.

The plurality of panel carriers (tools) are compatible with modules to be used during different stages of the build process. The modules can be any desired module to complete the structures assembly. Some examples of modules include panel alignment manipulators, work platforms for human access, quality inspection, or robots for assembly.

The illustrative examples reduce the wasteful time of moving fuselage panels from one set of tooling to another throughout the build process by using the same tools for shipping, assembly and joining. The illustrative examples also reduce factory congestion by having one set of tools that cycles with the product. By having the panels supported by the plurality of panel carriers (tools) it reduces the condition of assembly requirements allowing mechanics and heavy tools onto the airplane sooner. By having the plurality of panel carriers (tools) supporting the structure and not the structure supporting itself, tools and mechanics would be allowed on the fuselage much sooner.

The plurality of panel carriers (tools) reduce the precision required to locate the panels relative to the others by requiring less precision for locating the tools. The plurality of panel carriers provides macro indexing for the plurality of panels. The carrier and operational frame system removes the variation in locating the plurality of panels relative to each other at the macro level. After indexing the plurality of panels at the macro level using the plurality of panel carriers, panel manipulators on each of the plurality of panel carriers performs micro index adjustments.

Exchangeable modules are used within number of operational locations to perform manufacturing operations on the panels. By having exchangeable modules for the specific operations, the illustrative examples reduce wasteful time moving equipment and tools around.

By designing the panel carriers to always stay with the respective panel, the separate shipping, handling and assembly tools can be eliminated. The plurality of panel carriers (tools) themselves assemble to create the support and access around the structure. In some illustrative examples, the plurality of panel carriers (tools) have a male/female type indexing system which make them easier to locate and place.

The modular aspect of the operational assemblies allows the user to choose which tools and equipment are in position. By making the operational assemblies modular, space is saved and accessibility to the fuselage is improved.

The carrier and operational frame system provides cost savings by making the fuselage assembly process more efficient. The carrier and operational frame system would also come with a significant cost avoidance benefit by eliminating the need to design and fabricate future tools for design changes to a structure. The operational locations allow for changing operations or operational positions on the plurality of panels. The carrier and operational frame system makes the build process more flexible and easier to adapt to changes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of assembling a structure, the method comprising:

attaching each panel of a plurality of panels to a respective panel carrier of a plurality of panel carriers to form transportation assemblies;

transporting the transportation assemblies comprising the plurality of panel carriers to a manufacturing environment from a location outside of the manufacturing environment, wherein each panel carrier of the plurality of panel carriers is attached to a respective panel of the plurality of panels;

connecting the plurality of panel carriers to form an operational platform around the plurality of panels; and performing at least one manufacturing operation on at least one panel of the plurality of panels through the operational platform.

2. The method of claim 1, wherein attaching each panel of the plurality of panels to the respective panel carrier of the plurality of panel carriers comprises using a respective temporary fitting to form the transportation assemblies; and transporting the transportation assemblies occurs prior to connecting the plurality of panel carriers.

3. The method of claim 1 further comprising:

indexing each of the plurality of panels to a respective panel carrier of the plurality of panel carriers; and wherein attaching each panel of the plurality of panels to the respective panel carrier of the plurality of panel carriers comprises using a respective temporary fitting to form the transportation assemblies.

4. The method of claim 3, wherein connecting the plurality of panel carriers to form an operational platform around the plurality of panels aligns the plurality of panels relative to each other.

5. The method of claim 4 further comprising:
moving at least one panel of the plurality of panels using panel manipulative arms connected to the operational platform to position the at least one panel relative to an adjacent panel within a desired tolerance.

6. The method of claim 1, wherein performing at least one manufacturing operation on at least one panel comprises fastening the plurality of panels together.

7. The method of claim 1, wherein performing at least one manufacturing operation on at least one panel comprises attaching a number of frames to the at least one panel.

8. The method of claim 1 further comprising:
positioning an operational assembly into an operational location of the operational platform, wherein the operational assembly is an exchangeable module.

9. The method of claim 1, wherein the structure is a fuselage of an aircraft.

10. A method of assembling a structure, the method comprising:
attaching a panel to a panel carrier, the panel carrier having a frame and indexing features configured to hold the panel;
transporting the panel carrier to a manufacturing environment from a location outside of the manufacturing environment with the panel attached to the panel carrier;
connecting the panel carrier holding the panel to a second panel carrier holding a second panel to form a carrier and operational frame system around a plurality of panels, the plurality of panels comprising the panel and the second panel; and
performing at least one manufacturing operation on the panel through an operational platform of the panel carrier.

11. The method of claim 10, wherein transporting the panel on the panel carrier occurs prior to connecting the panel carrier to the second panel carrier.

12. The method of claim 10 further comprising:
indexing the panel to the panel carrier prior to attaching the panel to the panel carrier.

13. The method of claim 12, wherein connecting the panel carrier to the second panel carrier aligns the panel and the second panel.

14. The method of claim 13 further comprising:
moving at least one of the panel or the second panel using panel manipulative arms connected to the carrier and operational frame system to position the panel relative to the second panel within a desired tolerance.

15. The method of claim 10, wherein the at least one manufacturing operation is performed by a robotic arm connected to the panel carrier.

16. The method of claim 10, wherein performing at least one manufacturing operation on the panel through the operational platform of the panel carrier comprises attaching a number of frames to the panel.

17. The method of claim 10 further comprising:
inserting an operational assembly into an operational location of the panel carrier, wherein performing the at least one manufacturing operation is performed from the operational location.

18. The method of claim 17 wherein the operational assembly is an exchangeable module, the method further comprising:
securing the operational assembly to the operational location using modular connectors.

19. The method of claim 17 wherein the operational assembly comprises a robotic end effector, and wherein performing the at least one manufacturing operation on the panel comprises performing the at least one manufacturing operation with the robotic end effector.

20. A carrier and operational frame system comprising:
a plurality of panel carriers, each panel carrier comprising a frame configured to act as a strongback to a panel and each panel carrier comprising indexing features configured to interface with at least one other panel carrier of the plurality of panel carriers, wherein each panel carrier of the plurality of panel carriers is attached to a respective panel of a plurality of panels to form transportation assemblies; and
wherein the transportation assemblies are transported to a manufacturing environment from a location outside of the manufacturing environment while each respective panel of the plurality of panels is attached to each panel carrier of the plurality of panel carriers.

21. The carrier and operational frame system of claim 20, wherein at least one panel carrier comprises a number of operational locations configured to receive a respective operational assembly.

22. The carrier and operational frame system of claim 21, wherein each operational assembly is an exchangeable module configured to connect to an operational location.

23. The carrier and operational frame system of claim 21, wherein at least one operational assembly comprises a robotic arm for performing manufacturing operations from a respective operational location.

24. The carrier and operational frame system of claim 20, wherein each panel carrier is configured to support the respective panel during transporting, staging, and manufacturing operations.

25. The carrier and operational frame system of claim 20, wherein the plurality of panel carriers is joined together to form an operational platform around the plurality of panels.

26. The carrier and operational frame system of claim 25, wherein the plurality of panel carriers joined together forms a strongback for the plurality of panels.

* * * * *